(12) United States Patent
Yamagata et al.

(10) Patent No.: US 7,742,604 B2
(45) Date of Patent: Jun. 22, 2010

(54) INTEGRATED CIRCUIT DEVICE, INFORMATION PROCESSING APPARATUS, MEMORY MANAGEMENT METHOD FOR INFORMATION STORAGE DEVICE, MOBILE TERMINAL APPARATUS, SEMICONDUCTOR INTEGRATED CIRCUIT DEVICE, AND COMMUNICATION METHOD USING MOBILE TERMINAL APPARATUS

(75) Inventors: Akihiko Yamagata, Kanagawa (JP); Masachika Sasaki, Kanagawa (JP); Masahiro Sueyoshi, Kanagawa (JP); Fumio Kubono, Tokyo (JP); Akira Fukada, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/402,190

(22) Filed: Mar. 11, 2009

(65) Prior Publication Data

US 2009/0173787 A1   Jul. 9, 2009

Related U.S. Application Data

(62) Division of application No. 10/362,691, filed as application No. PCT/JP2002/006323 on Jun. 25, 2002, now Pat. No. 7,508,946.

(30) Foreign Application Priority Data

Jun. 27, 2001  (JP)  ............................. 2001-194748
Jun. 27, 2001  (JP)  ............................. 2001-194749

(51) Int. Cl.
G06F 12/14  (2006.01)

(52) U.S. Cl. ........................ 380/270; 713/193; 235/382

(58) Field of Classification Search .................... 713/1, 713/2, 188, 194; 380/200, 201, 255, 270, 380/277; 726/2; 235/382
See application file for complete search history.

(56) References Cited

U.S. PATENT DOCUMENTS

| | | | | |
|---|---|---|---|---|
| 4,930,129 | A * | 5/1990 | Takahira | 714/766 |
| 5,497,411 | A * | 3/1996 | Pellerin | 455/411 |
| 5,563,395 | A * | 10/1996 | Hoshino | 235/380 |
| 5,778,222 | A * | 7/1998 | Herrick et al. | 707/9 |
| 5,929,414 | A * | 7/1999 | Saitoh | 235/380 |
| 6,324,402 | B1 * | 11/2001 | Waugh et al. | 455/445 |
| 7,162,058 | B2 * | 1/2007 | Mimura et al. | 382/124 |
| 2004/0019687 | A1 * | 1/2004 | Ozawa et al. | 709/229 |
| 2005/0278278 | A1 * | 12/2005 | Petev et al. | 707/1 |

* cited by examiner

*Primary Examiner*—Kimyen Vu
*Assistant Examiner*—Joseph Pan
(74) *Attorney, Agent, or Firm*—K&L Gates LLP

(57) ABSTRACT

A memory region on an IC card has a hierarchical structure. Each application allocated on the memory region is registered in a directory, and the memory region is managed in directory units. A personal identification code is set for each application and directory, and the access right is controlled in application units or directory units. If a mobile terminal is lost, the right to access each application in the IC card automatically disappears. Therefore, the right to access each application allocated to the memory region on the IC card is efficiently controlled.

8 Claims, 14 Drawing Sheets

PERSONAL IDENTIFICATION CODE
(PIC) DEFINING REGION

INTEGRATED CIRCUIT DEVICE, INFORMATION PROCESSING APPARATUS, MEMORY MANAGEMENT METHOD FOR INFORMATION STORAGE DEVICE, MOBILE TERMINAL APPARATUS, SEMICONDUCTOR INTEGRATED CIRCUIT DEVICE, AND COMMUNICATION METHOD USING MOBILE TERMINAL APPARATUS

CROSS REFERENCES TO RELATED APPLICATIONS

The present application is a divisional of U.S. patent application Ser. No. 10/362,691, filed on Feb. 26, 2003 which is a National Stage of International Application No. PCT/JP2002/06323 filed on Jun. 25, 2002, and which claims priority to Japanese Patent Document No. P2001-194748 filed on Jun. 27, 2001 and Japanese Patent Document No. P2001-194749 filed on Jun. 26, 2001, the disclosures of which are herein incorporated by reference.

BACKGROUND

The present invention relates to information storage media with memory regions, IC chips with memory regions, information processing apparatuses having the IC chips with the memory regions, and memory management methods for the information storage media, and particularly relates to an information storage medium for use by being placed in an information processing apparatus such as a cellular phone or a PDA (Personal Digital Assistant), an IC chip with a memory region, an information processing apparatus having the IC chip with the memory region, and a memory management method for the information storage medium.

More particularly, the present invention relates to an information storage medium in which one or more applications are allocated to a memory region, an IC chip with a memory region, an information processing apparatus having the IC chip with the memory region, and a memory management method for the information storage medium, and more particularly relates to an information storage medium for controlling the right to access each application allocated to a memory region, an IC chip with a memory region, an information processing apparatus having the IC chip with the memory region, and a memory management method for the information storage medium.

The present invention also relates to a mobile terminal having an IC chip placed therein, which is driven by receiving power using wireless communication with an external apparatus, and to an IC card for use in conjunction with the mobile terminal, and more particularly relates to a mobile terminal having an IC chip placed therein, which is driven by receiving power using wireless communication with an external apparatus and which has a memory function, a control method therefor, and an IC card with a memory function.

More particularly, the present invention relates to a mobile terminal in which one or more applications are allocated to a memory region on an IC chip, a control method therefor, and an IC card in which one or more applications are allocated to a memory region, and more particularly relates to a mobile terminal for controlling the right to access each application allocated to a memory region on an IC chip in application units, a control method therefor, and an IC card for controlling the right to access each application allocated to a memory region in application units.

Various apparatuses using a personal identification number or password for identification and authentication have been devised and put into practical use. (In general, the term "personal identification number" refers to a character string represented by a combination of numerals from 0 to 9, and the term "password" refers to a character string represented using numerals and general characters such as alphabet. In this specification, a set of a personal identification number and password may also be referred to as a "personal identification code (PIC)".)

For example, when a user wants to use an automatic teller machine (ATM) card at a bank or other financial institution, the user is prompted by a cash dispenser or the like to enter a personal identification number or password as means of identification. After it is confirmed that the user has entered the correct personal identification number or password, the user can draw money from the cash dispenser.

Other applications for the personal identification code include entering a personal identification code at a safety box placed at an accommodation facility such as a hotel, entering a password when logging into a computer, and concealing information on an information terminal.

A storage medium such as a magnetic stripe on a known ATM card for a bank has a storage region for use solely in that bank. Entering the above-described personal identification number or password merely accesses the single storage region. The user is thus required to prepare cards for individual objectives or purposes and separately use the plural cards.

Recently, contactless IC cards have become widely used. For example, an IC card reader/writer placed at a cash dispenser, the entrance to a concert hall, or the ticket gate of a station accesses an IC card held thereabove in a contactless manner. The user inputs a personal identification number or password to the IC card reader/writer, and the input personal identification number or password is checked against a personal identification number or password stored on the IC card, thus performing identification or authentication between the IC card and the IC card reader/writer. When the identification or authentication succeeds, for example, the use of an application stored in the IC card is permitted. One possible type of application stored in the IC card is value information, such as electronic money or an electronic ticket.

Due to the improvement of miniaturization technology, IC cards with relatively high-capacity storage spaces have appeared and been widely used recently. Since known ATM cards only have a single storage region, that is, a single application, the user is required to carry a plurality of cards in accordance with objectives or purposes. In contrast, an IC card with a high-capacity memory stores a plurality of applications at the same time. A single IC card thus serves a plurality of purposes. For example, a single IC card stores two or more applications, such as electronic money for conducting electronic transactions and an electronic ticket for entering a specific concert hall. This single IC card serves various purposes.

When such an IC card with a high-capacity memory function (or a semiconductor IC chip with a data carrier function and/or an authentication function) is placed on a mobile terminal such as a cellular phone, a user having the mobile terminal is allowed to exchange electronic value information with the outside world, such as conducting an electronic transaction.

Since known ATM cards have only a single purpose (as described above), a magnetic stripe on each ATM card has a single personal identification number or password to manage the security of the entire card.

In contrast, IC cards with memory functions capable of storing a plurality of applications and mobile terminals having such IC cards (or IC chips) placed therein are required to control the right to access each application because, when a single personal identification code is used to open access to all applications on the IC card, the security in case of loss or theft of the IC card is greatly degraded.

As a memory region placed on the IC card expands due to progress in the manufacturing technology, more numerous applications are allocated to the memory region on the IC card. When the applications are simply allocated to the memory region, the application arrangement becomes complicated for the user, and the user has difficulty in classifying and organizing the applications on the memory region.

In a case in which the right to access the applications is controlled by individual personal identification codes, when the user wants to use a plurality of correlated applications in a series of transactions, the user is required to sequentially input personal identification codes in the same transactions. As a result, the operability of the apparatus is greatly degraded.

It is an object of the present invention to provide an improved information storage medium with a memory region, an IC chip with a memory region, an information processing apparatus having the IC chip with the memory region, and a memory management method for the information storage medium.

It is another object of the present invention to provide an improved information storage medium for use by being placed on an information processing apparatus such as a cellular phone or a PDA (Personal Digital Assistant), an IC chip with a memory region, an information processing apparatus having the IC chip with the memory region, and a memory management method for the information storage medium.

It is yet another object of the present invention to provide an improved information storage medium in which one or more applications are allocated to a memory region, an IC chip with a memory region, an information processing apparatus having the IC chip with the memory region, and a memory management method for the information storage medium.

It is a further object of the present invention to provide an improved information storage medium for controlling the right to access each application allocated to a memory region, an IC chip with a memory region, an information processing apparatus having the IC chip with the memory region, and a memory management method for the information storage medium.

It is another object of the present invention to provide an improved information storage medium for efficiently managing a plurality of applications allocated to a memory region, an IC chip with a memory region, an information processing apparatus having the IC chip with the memory region, and a memory management method for the information storage medium.

SUMMARY

In view of the foregoing objects, according to a first aspect of the present invention, an integrated circuit device or a memory management method for an information storage device is provided including memory allocating means or step for allocating a memory region to each application;

personal identification code setting means or step for setting, for each application allocated to the memory region, a personal identification code for controlling the right to access each application; and accessibility/inaccessibility managing means or step for managing each application allocated to the memory region to be accessible/inaccessible, wherein the accessibility/inaccessibility managing means or step sets each application for which the personal identification code is set to be inaccessible in a default setting, and, in response to the fact that the personal identification code input from a user matches the set personal identification code, the accessibility/inaccessibility managing means or step sets the corresponding application to be accessible.

The integrated circuit device according to the first aspect of the present invention is provided in the form of, for example, an IC chip. A cartridge which has the IC chip with an antenna and which is formed in the size of a credit card is generally referred to as an "IC card". The IC chip is used by being embedded in a mobile terminal such as a cellular phone or a PDA or in other information processing apparatuses. The IC card may be used by being inserted into an information processing apparatus. Applications for the IC chip or IC card include functions related to value information, such as prepaid electronic money or an electronic ticket. In the following description, the functions provided by the IC chip or IC card may also be referred to "applications".

By allocating the memory region to each application in a hierarchical manner using directories, the memory allocating means or step manages the memory space in the IC card arranged as a hierarchical structure. Accordingly, correlated applications, such as a plurality of applications used in a series of transactions, are stored in the same directory to enable the user to efficiently classify and organize the applications.

When an external apparatus has a card reader, the external apparatus can access the IC chip via a wireless interface. The right to access the memory region in the IC chip or the like is controlled by matching of personal identification codes. A personal identification code may be input using an information processing apparatus having embedded therein the IC chip to disengage the lock. Subsequently, a wireless link may be established, and access to the memory region may be permitted. Alternatively, after a wireless link between the IC chip in the information processing apparatus and the external apparatus is established, the access right is controlled on the basis of a personal identification code input using the external apparatus.

In such a case, the personal identification code setting means or step may set, for each application and directory, the personal identification code for controlling the right to access each application and directory. The accessibility/inaccessibility managing means or step may set each application and directory for which the personal identification code is set to be inaccessible in the default setting, and, in response to the fact that the personal identification code input from the user matches the set personal identification code, the accessibility/inaccessibility managing means or step may set the corresponding application or directory to be accessible.

In response to the fact that the personal identification code input from the user matches the personal identification code set for one of the directories, the accessibility/inaccessibility managing means or step may set all applications and subdirectories under the directory to be accessible.

According to the integrated circuit device and the memory management method for the information storage device according to the first aspect of the present invention, the memory space has a hierarchical structure. By allocating a directory to each application, the applications are efficiently managed in directory units.

For example, highly-correlated applications, such as those used in a series of transactions, are registered in the same directory (and highly-correlated sub-directories are registered in the same directory). Accordingly, the application and directory arrangement in the memory region is well organized, and the user can efficiently classify and organize the applications.

According to the integrated circuit device and the memory management method for the information storage device according to the first aspect of the present invention, in addition to setting the personal identification code for each application, the personal identification code can be set for each directory. In addition to controlling the access right in application units, the access right can be efficiently controlled in directory units.

For example, the user inputs a personal identification code corresponding to a directory. The input personal identification code is checked and authenticated, and the user is thus given the right to access all applications (and sub-directories) in the directory. For example, the user obtains the right to access all applications used in a series of transactions by inputting a personal identification code for the corresponding directory once. Access control is thus efficiently performed, and the operability of the apparatus is thus improved.

The integrated circuit device or the memory management method for the information storage device according to the first aspect of the present invention may further include private key setting means or step for setting, for each application and directory allocated to the memory region, a private key for authentication. In such a case, the accessibility/inaccessibility managing means or step may set the inaccessible application or directory to be accessible when the inaccessible application or directory is mutually authenticated by a predetermined certificate authority using the private key.

The integrated circuit device or the memory management method for the information storage device may further include access denying means or step for causing each accessible application and directory to be inaccessible in response to cutting off the power to the integrated circuit device or the information storage device.

When the IC card is lost or stolen, the user may suffer from damage since the applications and directories may be used without permission or fraudulently. According to the first aspect of the present invention, access to all applications and directories is automatically denied in response to cutting off the power to the IC card. In case of loss of IC card, the IC card is prevented from being maintained as accessible and from being used fraudulently by a malicious user.

The integrated circuit device or the memory management method for the information storage device may include number-of-input-failure storing means or step for storing the number of failures of input of the personal identification code for each application and directory allocated to the memory region; and maximum-permissible-number-of-input-failure setting means for setting the maximum permissible number of failures of input of the personal identification code for each application and directory allocated to the memory region. In such a case, the accessibility/inaccessibility managing means or step may set the application or directory in which the number of input failures has reached the maximum permissible number of inputs to be inaccessible.

The integrated circuit device or the memory management method for the information storage device may include number-of-input-failure initializing means or step for clearing the number of input failures stored in the number-of-input-failure storing means or step by a manager mutually authenticated by a predetermined certificate authority.

According to a second aspect of the present invention, a mobile terminal apparatus is provided including:

a semiconductor integrated circuit device having a memory region;

one or more applications allocated to the memory region, wherein the right to access each application is controlled by a personal identification code;

a wireless interface for enabling the semiconductor integrated circuit device to perform wireless communication with an external apparatus;

a wired interface for performing wired communication with the semiconductor integrated circuit device;

user input means for inputting, from a user, the personal identification code and other data;

checking means for transferring the personal identification code input from the user input means via the wired interface to the semiconductor integrated circuit device and for checking the personal identification code with a personal identification code for each application allocated to the memory region; and access-right control means for giving, as a result of checking by the checking means, a right to the user to access the application in which the personal identification codes match each other.

The term mobile terminal apparatus here indicates an information processing apparatus, such as a cellular phone or a PDA (Personal Digital Assistant), which is small and light enough to be carried by the user. Also, the term semiconductor integrated circuit device indicates an IC chip with an authentication function for implementing the access operation.

The IC chip placed on the mobile terminal apparatus according to the second aspect of the present invention includes a wireless interface for establishing a wireless link with an external apparatus such as a reader/writer and a wired interface for establishing an internal connection with a controller of the mobile terminal having the IC chip. In response to establishment of a wireless link with the reader/writer, the IC chip can be activated by electromagnetic waves sent from the reader/writer.

The IC chip placed on the mobile terminal apparatus according to the second aspect of the present invention includes the memory region. One or more applications are allocated to the memory region. The right to access each application is controlled by the personal identification code such as a personal identification number or password. The term application here includes value information, such as electronic money or an electronic ticket.

When a wireless link with the external apparatus such as the reader/writer is established, a personal identification code input using the reader/writer may be input to the IC chip via the wireless interface. A personal identification code input from a user input unit such as a keyboard of the mobile terminal apparatus may be input to the IC chip via the wired interface. The personal identification code input via the wireless interface or the wired interface is checked against the correct personal identification code, and the right to access the corresponding application is given if the personal identification codes match each other.

According to the second aspect of the present invention, a personal identification code for a desired application is input using the mobile terminal apparatus. The mobile terminal is held towards the external apparatus such as the reader/writer, and hence the application can be used using the external apparatus (such as conducting an electronic transaction). Accordingly, the user can input a personal identification code using the user's mobile terminal the user is familiar with, instead of using a user interface of the external apparatus the user is unfamiliar with, and the input personal identification code is thus checked. In other words, a personal identification code may be input using the information processing apparatus having the IC chip embedded therein to disengage the lock. Subsequently, a wireless link may be established with the external apparatus, thus permitting access to the memory region. Needless to say, after a wireless link between the IC chip in the information processing apparatus and the external apparatus is established, the access right may be controlled on the basis of a personal identification code input using the external apparatus.

The access-right control means may permit the external apparatus to access the application for which the access right is given via the wireless interface using wireless communication.

In response to detecting no electromagnetic waves from the external apparatus connected via the wireless interface, the access-right control means may determine that a series of transactions related to the application for which the access right is given has terminated and performs transaction termination processing. As a result, after being used, the IC chip is not maintained in a state in which each application is accessible. For example, when the mobile terminal apparatus is lost or stolen, unauthorized use of the application is prevented. The user is thus prevented from suffering from unauthorized use or theft of value information such as electronic money.

In response to receiving no response within a predetermined period of time in response to a command sent from the IC chip via the wireless interface, the access-right control means may determine that a series of transactions between the external apparatus and the IC chip, which are connected with each other via the wireless interface, has terminated normally or abnormally and may perform termination processing. As a result, after the wireless link with the external apparatus is broken, the IC chip is not maintained in a state in which each application is accessible. For example, when the mobile terminal apparatus is lost or stolen, unauthorized use of the application is prevented. The user is thus prevented from suffering from unauthorized use or theft of value information such as electronic money.

The mobile terminal apparatus according to the second aspect of the present invention may further include personal identification code registering means for registering in advance the personal identification code for each application; program activating means; and personal identification code input means for inputting the personal identification code for the corresponding application in accordance with the activated program to the IC chip via the wired interface. In such a case, the user selects a desired program from a menu screen displayed on the display, and the corresponding program is called to the mobile terminal. In response to the activated program, a personal identification code for the corresponding application is input to the IC chip via the wired interface, and the right to access the application is thus given. The user can omit the inputting of a personal identification code for a desired application, and operability is improved.

In response to being connected to the external apparatus via the wireless interface and thus receiving power, the IC chip may notify via the wired interface of the necessity to input the personal identification code for accessing the memory region on the IC chip. In response to the notification, the mobile terminal having the IC chip displays a dialog on a display or emits a beep to prompt the user. Accordingly, the user is reliably reminded of the necessity to input a personal identification code when the user holds the mobile terminal above the external apparatus such as the reader/writer to use the application. Application use in every aspect of the user's everyday life is thus facilitated.

According to a third aspect of the present invention, a communication method using a mobile terminal apparatus having a semiconductor integrated circuit device which has a memory region and which communicates with an external apparatus is provided.

The mobile terminal apparatus includes a wireless interface for enabling the semiconductor integrated circuit device to perform wireless communication with the external apparatus and a wired interface for performing wired communication with the semiconductor integrated circuit device in the mobile terminal apparatus.

One or more applications is allocated to the memory region, wherein the right to access each application is controlled by a personal identification code. The communication method includes:

a user input step of inputting, from a user, the personal identification code;

a sending step of sending the personal identification code input in the user input step via the wired interface to the semiconductor integrated circuit device;

a checking step of checking the personal identification code input in the user input step against a personal identification code for each application allocated to the memory region; and an access-right control step of giving, as a result of checking in the checking step, a right to the user to access the application in which the personal identification codes match each other.

The semiconductor integrated circuit device placed on the mobile terminal apparatus according to the third aspect of the present invention is formed of, for example, an IC chip. The IC chip includes a wireless interface for establishing a wireless link with an external apparatus such as a reader/writer and a wired interface for establishing an internal connection with a controller of the mobile terminal apparatus having the IC chip. In response to establishment of a wireless link with the reader/writer, the IC chip is activated by electromagnetic waves sent from the reader/writer.

The semiconductor integrated circuit device placed on the mobile terminal apparatus according to the third aspect of the present invention has the memory region of relatively high capacity. One or more applications are allocated to the memory region. The right to access each application is controlled by the personal identification code such as a personal identification number or password. The term application here includes value information, such as electronic money or an electronic ticket.

When a wireless link with the external apparatus such as the reader/writer is established, a personal identification code input using the reader/writer may be input to the IC chip via the wireless interface. A personal identification code input from a user input unit such as a keyboard of the mobile terminal apparatus may be input to the IC chip via the wired interface. The personal identification code input via the wireless interface or the wired interface is checked against the correct personal identification code, and the right to access the corresponding application is given if the personal identification codes match each other.

According to the third aspect of the present invention, a personal identification code for a desired application is input using the mobile terminal apparatus. The mobile terminal is held towards the external apparatus such as the reader/writer, and hence the application can be used using the external apparatus (such as conducting an electronic transaction). Accordingly, the user can input a personal identification code using the user's mobile terminal the user is familiar with, instead of using a user interface of the external apparatus the user is unfamiliar with, and the input personal identification code is thus checked.

In the access-right control step, the external apparatus may be permitted to access the application for which the access right is given via the wireless interface using wireless communication.

In the access-right control step, in response to detecting no electromagnetic waves from the external apparatus connected via the wireless interface, it may be determined that a series of transactions related to the application for which the access right is given has terminated, and transaction termination processing may be performed. As a result, after being used, the semiconductor integrated circuit device is not maintained in a state in which each application is accessible. For example, when the mobile terminal apparatus is lost or stolen, unauthorized use of the application is prevented. The user is thus prevented from suffering from unauthorized use or theft of value information such as electronic money.

In the access-right control step, in response to receiving no response within a predetermined period of time in response to a command sent from the IC chip via the wireless interface, it may be determined that a series of transactions between the external apparatus and the IC chip, which are connected with each other via the wireless interface, has terminated normally or abnormally, and termination processing may be performed. As a result, after the wireless link with the external apparatus is broken, the IC chip is not maintained in a state in which each application is accessible. For example, when the mobile terminal apparatus is lost or stolen, unauthorized use of the application is prevented. The user is thus prevented from suffering from unauthorized use or theft of value information such as electronic money.

The communication method using the mobile terminal apparatus according to the third aspect of the present invention may further include a personal identification code registering step of registering in advance the personal identification code for each application; a program activating step; and a personal identification code input step of inputting the personal identification code for the corresponding application in accordance with the activated program to the semiconductor integrated circuit device via the wired interface. In such a case, the user selects a desired program from a menu screen displayed on the display, and the corresponding program is called to the mobile terminal. In response to the activated program, a personal identification code for the corresponding application is input to the semiconductor integrated circuit device via the wired interface, and the right to access the application is thus given. In such a case, the user can omit the inputting of a personal identification code for a desired application, and operability is improved.

The communication method using the mobile terminal apparatus may further include a notification step of notifying, in response to the fact that the semiconductor integrated circuit device is connected to the external apparatus via the wireless interface and thus receives power, of the necessity to input the personal identification code for accessing the memory region via the wired interface. In response to the notification, the mobile terminal apparatus having the IC chip displays a dialog on a display or emits a beep to prompt the user. Accordingly, the user is reliably reminded of the necessity to input a personal identification code when the user holds the mobile terminal above the external apparatus such as the reader/writer to use the application. Application use in every aspect of the user's everyday life is thus facilitated.

Further objects, features, and advantages of the present invention will become apparent from a more-detailed description of the preferred embodiments of the present invention with reference to the attached drawings.

DETAILED DESCRIPTION

With reference to the drawings, embodiments of the present invention will now be described in detail.

A. System Configuration

Figure 1:
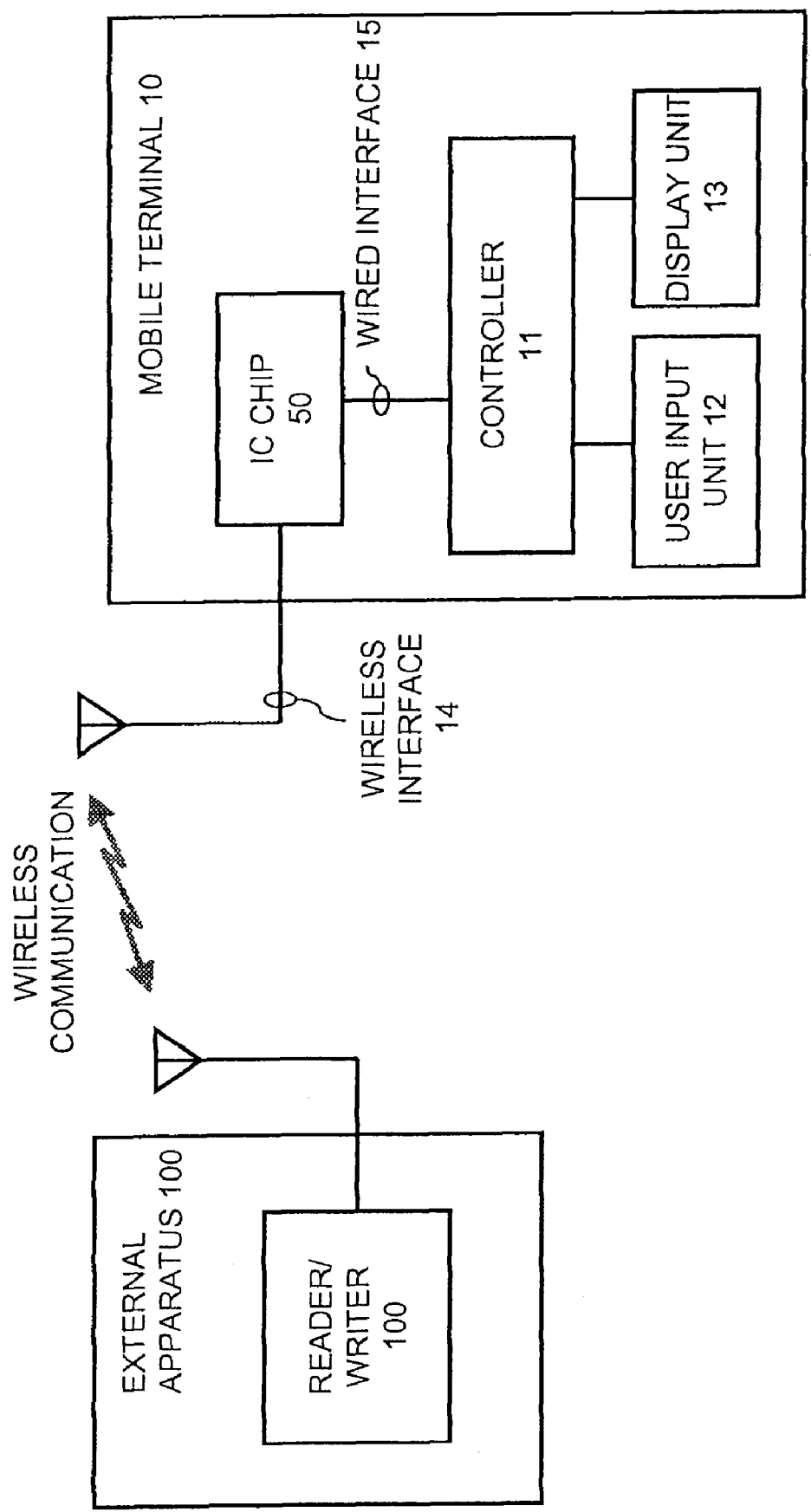
FIG. 1 is a diagram schematically showing the hardware configuration of a mobile terminal 10 according to an embodiment of the present invention.

FIG. 1 schematically shows the hardware configuration of a mobile terminal 10 according to an embodiment of the present invention. The mobile terminal 10 is an information processing terminal, such as a cellular phone or a PDA (Personal Digital Assistant), which is small and light enough to be carried by a user.

The mobile terminal 10 shown in the diagram includes an IC chip 50 which is driven by receiving power using wireless communication with an external apparatus and which has a memory function, a controller 11 for controlling the overall internal operation of the mobile terminal 10, a user input unit 12 formed of keys/buttons for inputting by the user various character strings and commands, such as a personal identification number or password, and a display unit 13, such as an LCD (liquid Crystal Display), for displaying the processing result. Needless to say, the mobile terminal 10 may include peripheral units and circuit components other than those shown in the diagram in order to implement the primary function of the mobile terminal 10.

A cartridge which has an IC chip with an antenna and which is formed in the size of a credit card is generally referred to as an "IC card".

The mobile terminal 10 can be equipped with the IC chip 50 in a variety of different ways. For example, a semiconductor IC chip in conjunction with a wireless antenna may be embedded in the mobile terminal 10. Alternatively, a card-shaped IC chip, that is, an IC card, may be used by being inserted into a card slot arranged in the mobile terminal 10. Applications for the IC chip or IC card include functions related to value information, such as prepaid electronic money or an electronic ticket. In the following description, the functions provided by the IC chip or IC card may also be referred to "applications".

The controller 11 is formed by integrating a CPU (Central Processing Unit), a ROM (Read Only Memory), a RAM (Random Access Memory), and the like. The controller 11 executes program code stored on the ROM to control various operations in the mobile terminal 10.

The IC chip 50 includes a wireless interface 14 for establishing a wireless link with an external apparatus 100 and a wired interface 15 for establishing a wired connection with the controller 11 of the mobile terminal 10. The wireless interface 14 uses, for example, a contact interface standard defined by ISO 7816 or a wireless interface standard defined by ISO 14443. The scheme for establishing a link or connection between the IC chip 50 and the external apparatus 100 will be described later.

The IC chip 50 is manufactured by adopting, for example, a contactless IC chip technology. The IC chip 50 is driven by electromagnetic waves received from the external apparatus 100 via the wireless interface 14. In other words, when the user is not holding the mobile terminal 10 above the external apparatus 100, electromagnetic waves from the external apparatus 100 do not reach the mobile terminal 10, and the operation of the IC chip 50 is deactivated. In this embodiment, the right to access the interior of the IC chip 50 disappears in response to cutting off the electromagnetic waves (this will be described later).

The IC chip 50 according to this embodiment has a memory region. Such a memory region is made possible by miniaturization technology. The memory region is formed of a semiconductor memory, a magnetic stripe, or other readable/writable storage media. One or more applications are allocated to the memory region. One example of application is value information, such as electronic money or an electronic ticket.

In this embodiment, a memory space in the IC chip 50 has a hierarchical structure. Each application is allocated a directory. This enables applications to be efficiently managed in directory units. This will be described in detail later.

In order to protect value information stored in the memory space in the IC chip 50 from being used without permission or stolen, a personal identification code such as a personal identification number or password is set for each application. As a result, the right to access the memory region is controlled in application units. For example, a personal identification code input via the wireless interface 14 or the wired interface 15 is checked against a personal identification code for each application, and the right to access each application is given when the compared personal identification codes match each other (described later).

In this embodiment, apart from the above features in that the memory space has a hierarchical structure, that each application is allocated a directory, and that a personal identification code is set for each application, a personal identification code may also be set for each directory. The right to access is controlled not only in application units but also in directory units efficiently. The access right control will be described in detail later.

The external apparatus 100 is an apparatus using an application allocated to the memory region on the IC chip 50. The external apparatus 100 includes a reader/writer 101 for establishing a wireless link with the IC chip 50 using, for example, a contactless IC chip technology. Needless to say, the external apparatus 100 is equipped with other circuit components and peripheral devices for performing arithmetic processing for specific operations, and a display unit and an input unit for performing interactive input with the user (all of which are not shown).

The external apparatus 100 corresponds to, for example, an apparatus such as an ATM (Automatic Teller Machine) terminal in a bank for using electronic money; an apparatus for processing electronic value information, such as that installed at the entrance of a concert hall or the gate of a station or airport for using electronic tickets; and an apparatus such as a safety box at an accommodation facility for performing user identification or authentication.

According to the system configuration such as that shown in FIG. 1, the user inputs a personal identification code from the user input unit 12 of the mobile terminal 10 and disengages the lock. In some cases, the user confirms the numerals which are input by the user and which are displayed on the display unit 13 and sends the input personal identification code to the IC chip 50 embedded in the mobile terminal 10 via the wired interface 15. In the IC chip 50, the personal identification code input from the user is checked against a personal identification code set for each application or directory on the memory region. If the personal identification codes match each other, the user is given the right to access the memory region allocated to the corresponding application or directory. Alternatively, after a wireless link is established between the IC chip 50 in the mobile terminal 10 and the external apparatus 100, the right to access each application is controlled on the basis of a personal identification code input using the external apparatus 100.

Figure 2:
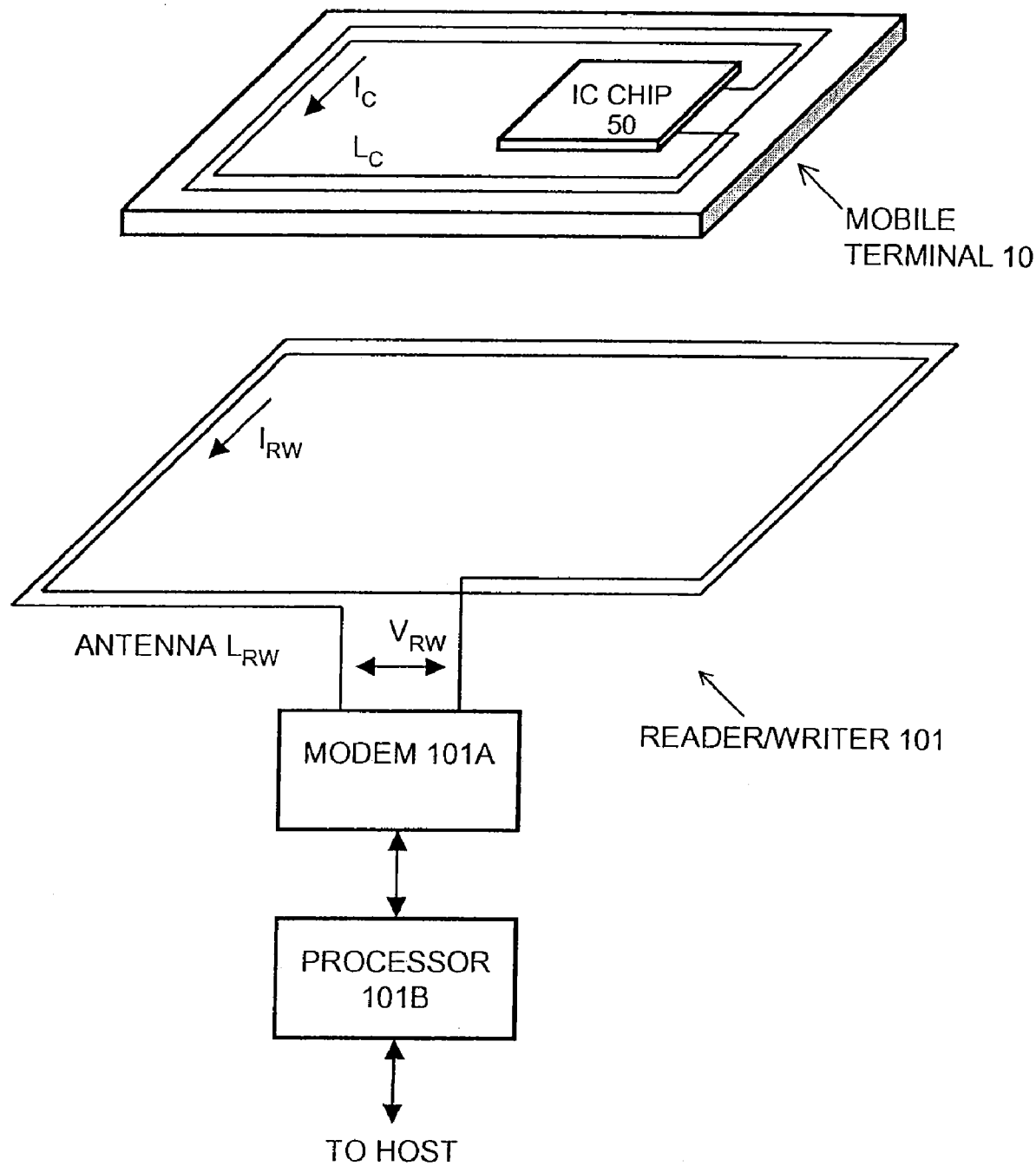
FIG. 2 is a conceptual diagram showing the mechanism of wireless communication between a reader/writer and an IC chip 50 based on electromagnetic induction.

Wireless communication between the reader/writer 101 and the IC chip 50 is implemented on the basis of, for example, the principle of electromagnetic induction. FIG. 2 conceptually depicts the mechanism of wireless communication between the reader/writer 101 and the IC chip 50 based on electromagnetic induction. The reader/writer 101 includes an antenna LRW formed of a loop coil. Allowing electric current IRW to flow through the antenna LRW generates a magnetic field around the antenna LRW. In contrast, at the IC chip 50 side, a loop coil LC is provided around the IC chip 50 in an electrical sense. At the ends of the loop coil LC of the IC chip 50, voltage is induced by the magnetic field generated by the loop antenna LC of the reader/writer 101, and the induced voltage is input to a terminal of the IC chip 50 connected to the ends of the loop coil LC.

Figure 3:
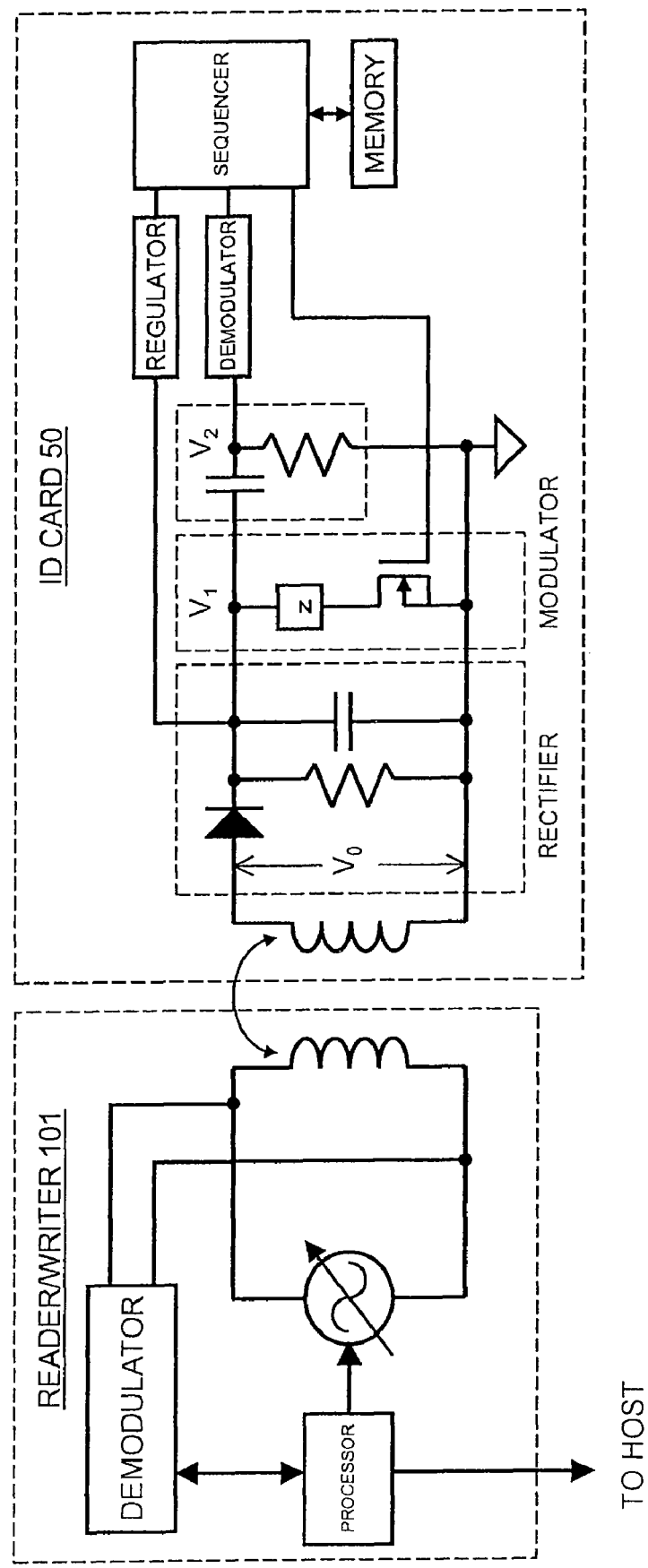
FIG. 3 is a model diagram of a system formed of the reader/writer 101 and the IC chip 50, the system serving as a transformer.

The degree of coupling between the antenna LRW of the reader/writer 101 and the loop coil LC of the IC chip 50 changes depending on the positional relationship thereof. It can be regarded that, as a system, a single transformer is provided. This can be depicted in the model diagram shown in FIG. 3.

The reader/writer 101 modulates the current IRW flowing through the antenna LRW to modulate a voltage V0 induced in the loop coil LC of the IC chip. Using this phenomenon, the reader/writer 101 sends data to the IC chip 50. The data sent in this case includes a personal identification code, such as a personal identification number or password input from the user at the external apparatus 100 side, for obtaining the right to access each application or directory, and value information e.g., electronic money or an electronic ticket, provided by each application.

The IC chip 50 has a load switching function for changing a load between terminals of the loop coil LC in accordance with data to be sent to the reader/writer 101. When the load between the terminals of the loop coil LC changes, the impedance between the antenna terminals of the reader/writer 101 changes. This results in a fluctuation in passing current IRW or voltage VRW of the antenna LRW. Demodulation of the fluctuation enables the reader/writer 101 to receive the data sent from the IC chip 50. The data received by the external apparatus 100 from the IC chip 50 includes value information, such as electronic money or an electronic ticket, provided by each application.

B. First Embodiment

In a first embodiment of the present invention, a storage region in the IC chip 50 embedded in the mobile terminal 10 has a hierarchical structure using directories. Each application allocated to the memory region is registered in a directory at a desired hierarchical level. For example, highly-correlated applications, such as applications for use in a series of transactions, are registered in the same directory (and highly-correlated sub-directories are registered in the same directory). Accordingly, the application and directory arrangement in the memory region is well organized, and the user can efficiently classify and organize the applications.

Hierarchical control over the access right is implemented by setting a personal identification code for each application, and, in addition to this, by setting a personal identification code for each directory. For example, the user inputs a personal identification code corresponding to a directory. The input personal identification code is checked and authenticated, and the user is thus given the right to access all applications (and sub-directories) in the directory. For example, the user obtains the right to access all applications used in a series of transactions by inputting a personal identification code for the corresponding directory once. Access control is thus efficiently performed, and the operability of the apparatus is thus improved.

Figure 4:
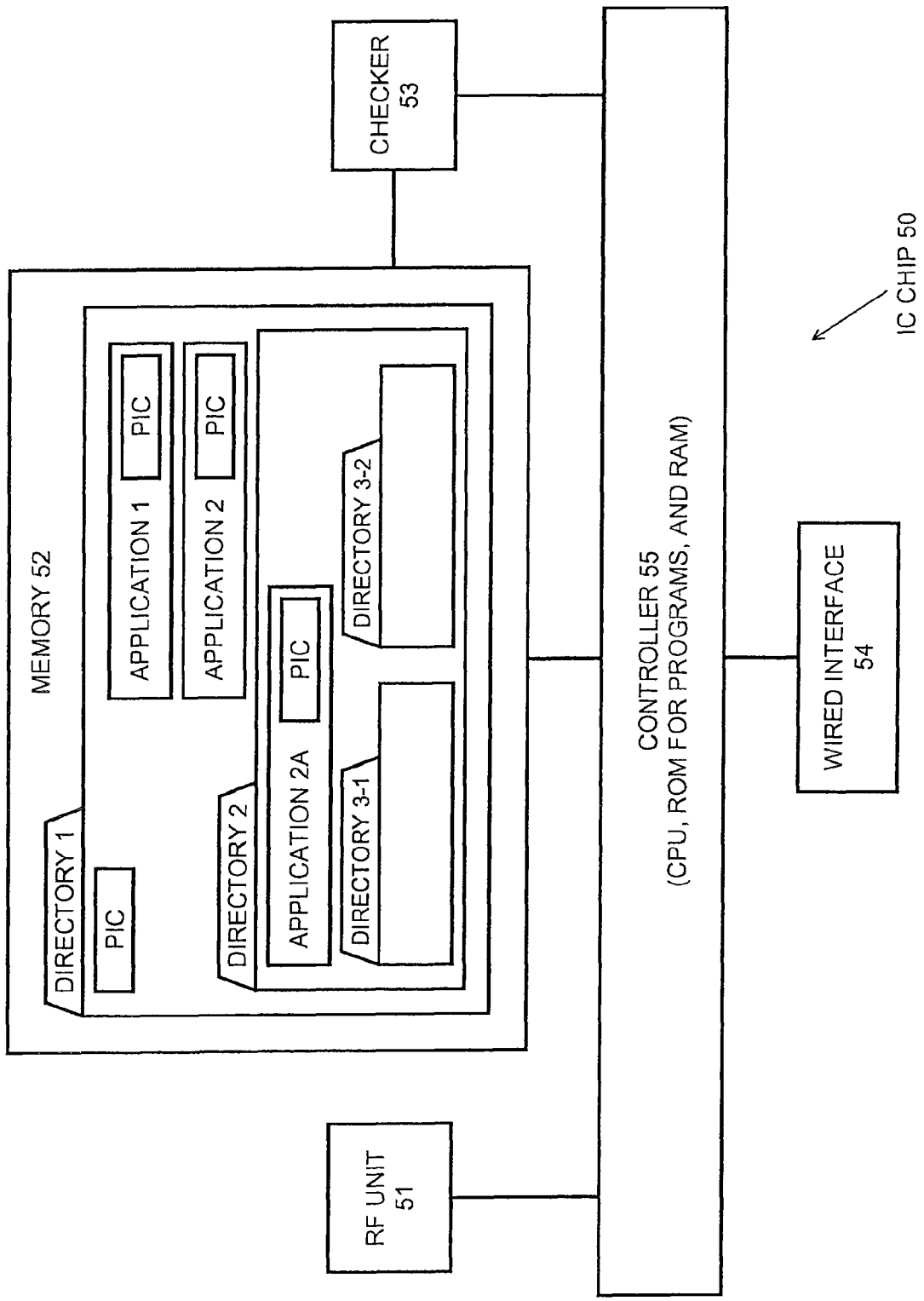
FIG. 4 is a block diagram showing the internal functional configuration of the IC chip 50 embedded in the mobile terminal 10 according to a first embodiment of the present invention.

FIG. 4 illustrates the internal functional configuration of the IC chip 50 embedded in the mobile terminal 10 according to this embodiment.

As shown in the diagram, the IC chip 50 includes an RF unit 51 having connected thereto an antenna for establishing a wireless link with the reader/writer 101 of the external apparatus 100, a memory 52 having a storage region individually allocated to each application, such as purchased-ticket information or depositor information (electronic money) at a bank, a checker 53 for comparing and checking a personal identification code, a wired interface 54, and a controller 55 for controlling the components in a general manner.

The controller 55 is formed by integrating a CPU (Central Processing Unit), a ROM (Read Only Memory), a RAM (Random Access Memory), and the like. The controller 55 executes program code stored on the ROM to control the internal operation of the IC chip 50. Also, the controller 55 communicates with the controller 11 of the mobile terminal 10 via the wired interface 54.

The memory 52 is used to allocate a storage region to one or more applications. The memory 52 can be implemented as any type of readable/writable storage medium, such as a semiconductor memory or a magnetic stripe, and is not limited to a particular device.

In this embodiment, a storage space of the memory 52 has a hierarchical structure using directories. Specifically, each application allocated to the memory region can be registered in a directory at a desired hierarchical level. For example, highly-correlated applications, such as applications for use in a series of transactions, are registered in the same directory (and highly-correlated sub-directories are registered in the same directory).

Applications and directories allocated in the memory 52 each have a persona identification code defining region. A personal identification code can be set for each application or directory. The right to access the memory 52 is controlled in application units and in directory units. The hierarchical structure, the hierarchical control over the access right, and the personal identification code defining region in the memory 52 will be described in detail later.

The checker 53 checks a personal identification code sent via the wired interface 54 against a personal identification code set in the memory region allocated to each application or directory and permits access to the memory region if the personal identification codes match each other. Information can be read from and written to the access-permitted memory region by the reader/writer 101 via the RF unit 51.

The personal identification code sent via the wired interface 54 is, in short, the personal identification code input from the user using the mobile terminal 10. In other words, according to this embodiment, the user can input a personal identification code using the user's mobile terminal 10 the user is familiar with, instead of using a user interface of the external apparatus 100 the user is unfamiliar with, and the input personal identification code is thus checked.

Figure 5:
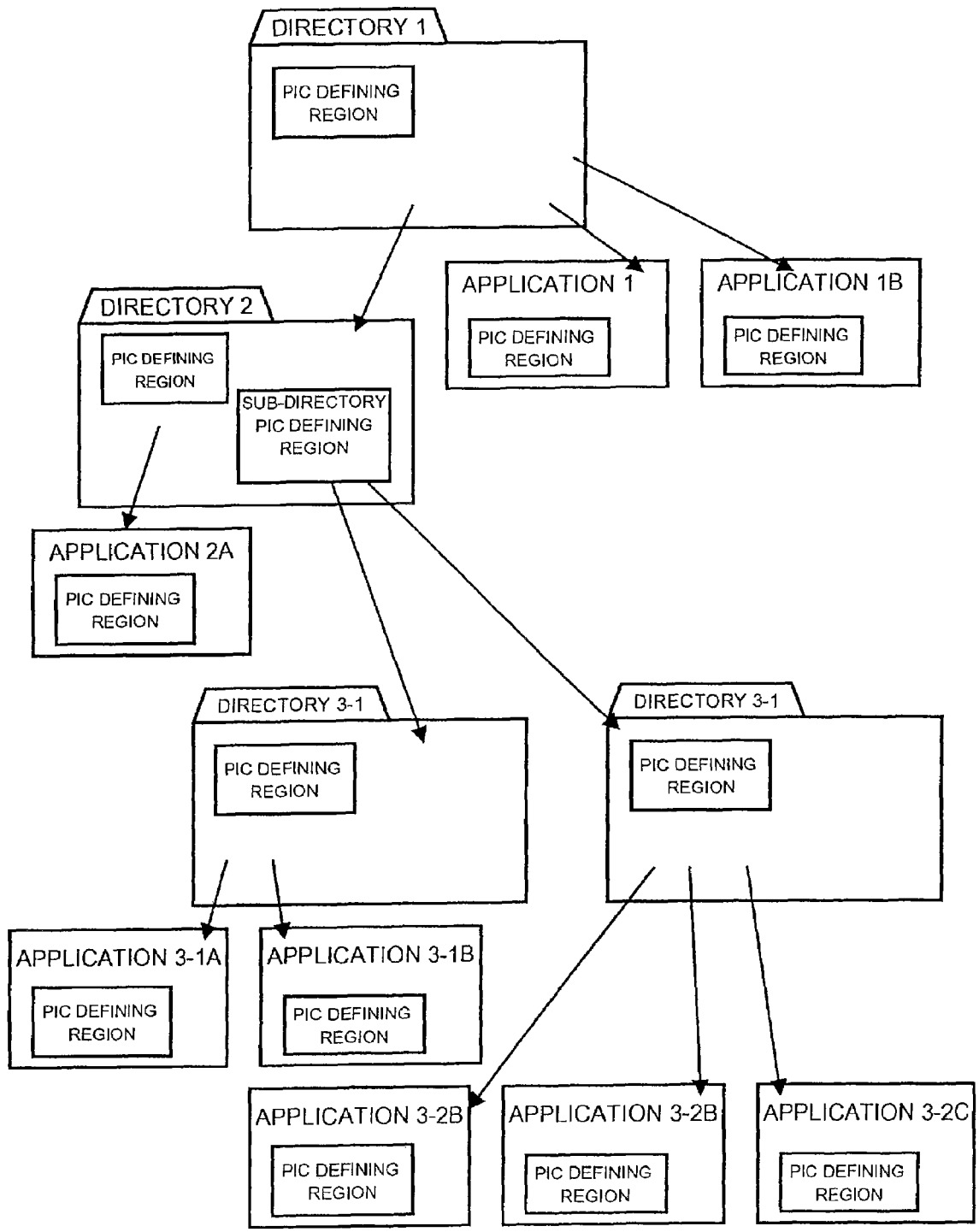
FIG. 5 is a diagram schematically showing an example of the configuration of a memory space in a memory 52 shown in FIG. 4.

FIG. 5 schematically shows an example of the configuration of the memory space in the memory 52 shown in FIG. 4. In the example shown in the diagram, directory 1 corresponding to a root directory includes application 1A and application 1B, and directory 2 that corresponds to a sub-directory.

Under directory 2, application 2A, and directory 3-1 and directory 3-2 corresponding to sub-directories are included.

Under directory 3-1, application 3-1A and application 3-1B are included. Under directory 3-2, application 3-2A, application 3-2B, and application 3-2C are included.

Figure 6:
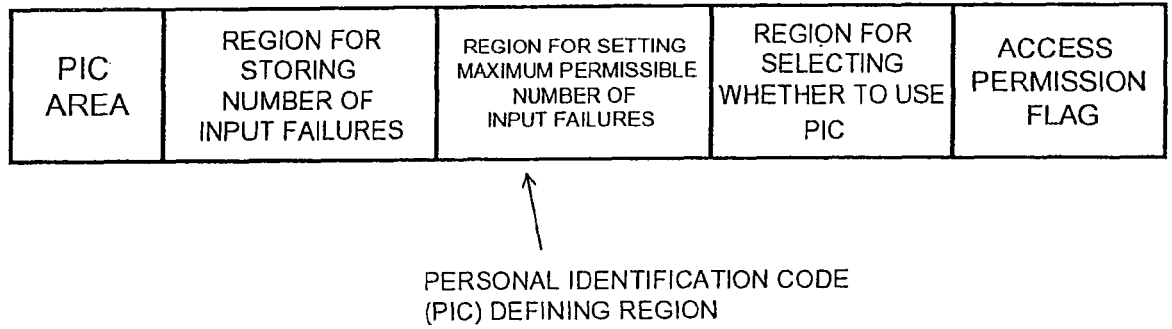
FIG. 6 is a diagram schematically showing the data structure of a personal identification code defining region.

As shown in FIG. 5, each application and directory allocated on the memory 52 is provided with a personal identification code defining region. FIG. 6 schematically shows the data structure of the personal identification code defining region. As shown in the diagram, the personal identification code defining region has a personal identification number region, a region for storing the number of input failures, a region for setting the maximum permissible number of input failures, a region for selecting whether to use a personal identification code, and an access permission flag.

When the user wants to access an application or directory, the user is prompted by the IC chip 50 to input a personal identification code. For example, a beep is emitted by the mobile terminal 10 or a dialog is displayed on the display unit 13 to prompt the user to input a personal identification code.

Only when the personal identification code input from the user matches the correct personal identification code, the access permission flag is put up in the personal identification code defining region in the corresponding application or directory, and access thereto is thus permitted.

The access permission flag indicates whether or not the corresponding application or directory is accessible. The application or directory having set therein the access permission flag is accessible. In a default setting, the access permission flag in each application or directory for which a personal identification code is set is inaccessible. After personal identification code checking or authentication using a private key succeeded, the access permission flag is set to allow the application or directory to become accessible. If the access permission flag is continuously set, the user may suffer from damage in case of loss or theft of the IC chip 50 or the mobile terminal 10 since the applications and directories may be used without permission or used fraudulently. The IC chip 50 according to this embodiment has a mechanism for automatically changing the accessible state to the inaccessible state, which will be described in detail later.

The record in the region for storing the number of input failures is updated every time an incorrect personal identification code is input. When the number of input failures reaches the maximum permissible number of input failures set in the region for setting the maximum permissible number of input failures, access to the corresponding application or directory is denied.

In general, the number of input failures should be cleared once the user succeeds in inputting the correct personal identification code. This scheme prevents a malicious user from checking every possible personal identification code to detect the correct personal identification code. When the user inputs incorrect personal identification codes and the number of input failures reaches the maximum permissible number of input failures, input of the personal identification code fails. In this case, only a manager managing the IC chip 50 may clear the region for storing the number of input failures. The manager may be authenticated by, for example, a private key, which will be described later.

When a personal identification code for a directory is input and access to the directory is thus permitted, access to all applications and directories below the directory may be permitted. For example, as in directory 2 shown in FIG. 5, a personal identification code for the directory itself and a personal identification code for a sub-directory(s) are individually arranged, thereby setting the personal identification code for controlling the right to access only applications belonging to directory 2 and the personal identification code for controlling the right to access only sub-directories 3-1 and 3-2 below directory 2.

The region for setting whether to use a personal identification code, which is in each personal identification code defining region, is used to select whether to set a personal identification code for the target region. Specifically, when a personal identification code is set, access to the corresponding application or directory is permitted if authentication by the personal identification code is successful. In contrast, an application or directory for which no personal identification code is set does not require personal identification code checking, and access to that application or directory is thus unrestricted.

In addition to a personal identification code, a private key may be set for each application or directory. In addition to authentication using input of a personal identification code, the private key may also be used as authentication means.

Figure 7:
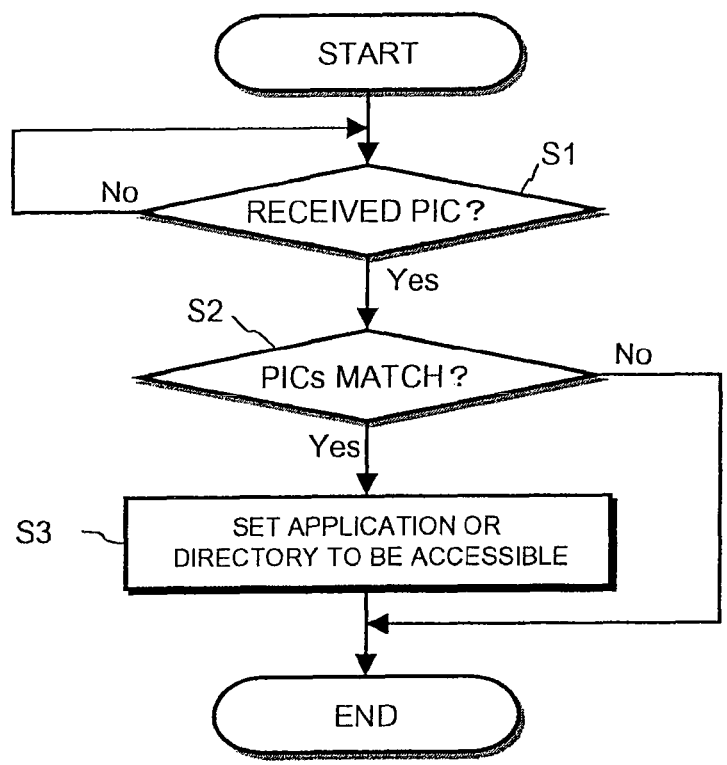
FIG. 7 is a flowchart showing a process of controlling the right to access a directory or application in accordance with a personal identification code input from a user.

FIG. 7 is a flowchart showing a process of controlling the right to access a directory or application in accordance with a personal identification code input from the user.

When the user inputs a personal identification code (step S1), the checker 53 accesses the personal identification code defining region of an application or directory in the memory space to determine whether or not the input personal identification code matches a personal identification code set for the application or directory (step S2).

When the personal identification code set for the application or directory matches the personal identification code input from the user, the access permission flag in the personal identification code defining region in the application or directory is set to make the application or directory accessible (step S3).

For example, the personal identification code input from the user using the user input unit 12 of the mobile terminal 10 may be sent via the wired interface 54 to the IC chip 50. Alternatively, the IC chip 50 is held above the reader/writer 101 of the external apparatus 100, and a personal identification code input using the user interface of the external apparatus 100 is sent via a wireless interface, which is the RF unit 51, to the IC chip.

Figure 8:
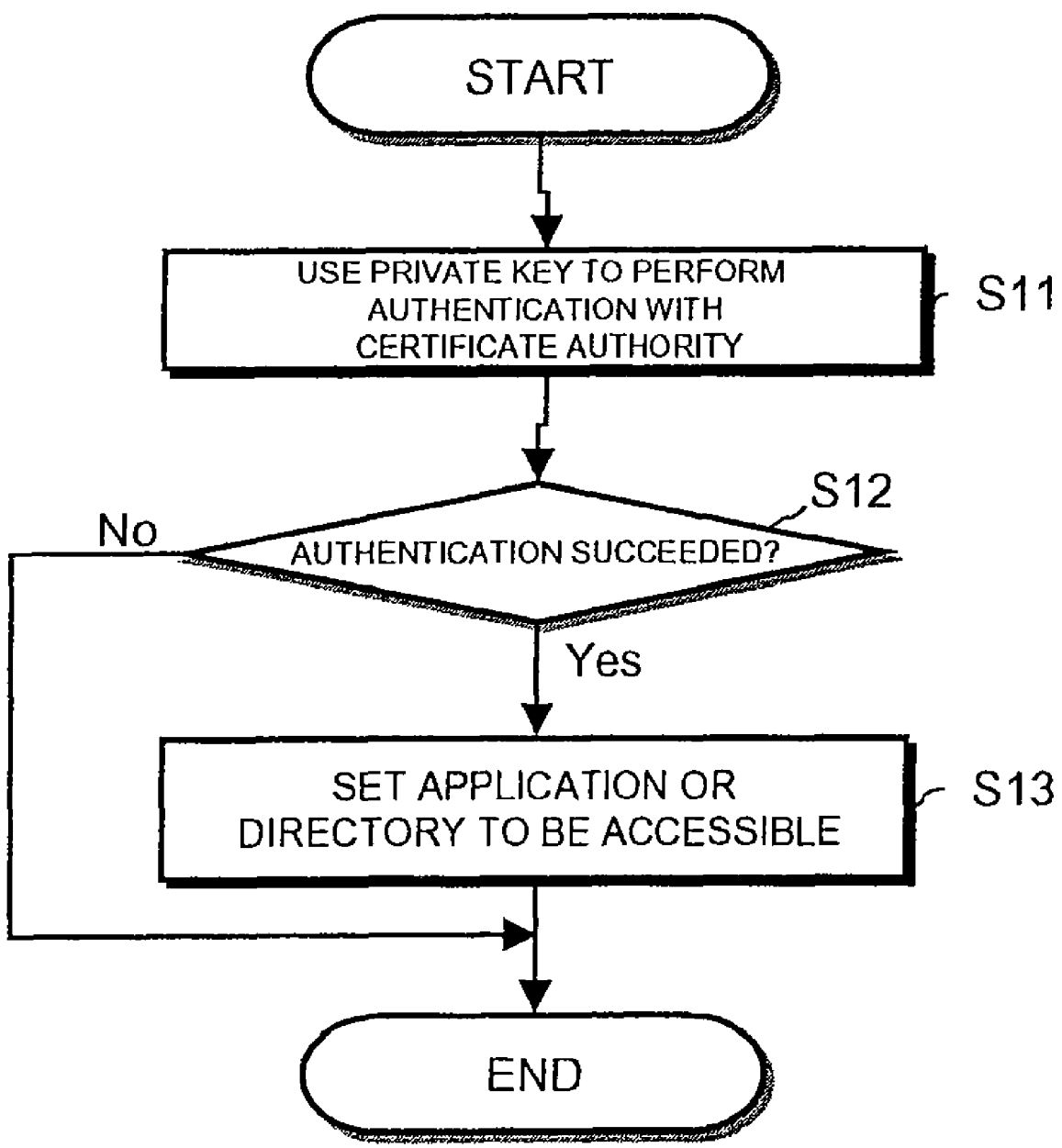
FIG. 8 is a flowchart showing a process of controlling the right to access a directory or application using a private key instead of the personal identification code input from the user.

FIG. 8 is a flowchart showing a process of controlling the right to access a directory or application using a private key in place of a personal identification code input from the user.

Using a private key set for a desired directory or application, authentication processing is performed with a predetermined certifying authority (step S11).

When authentication succeeded (step S12), the access permission flag in the personal identification code defining region of the directory or application is set to enable the directory or application to be accessible (step S13).

Needless to say, the right to access an application or directory may be controlled by a combination of checking a personal identification code input from the user, such as that shown in FIG. 7, and authentication processing using a private key, such as that shown in FIG. 8. In such a case, an application or directory is protected from being used without permission or being used fraudulently at a higher security level.

When the right to access an application or directory is controlled using a personal identification code such as that shown in FIG. 7, a malicious user may check every possible personal identification code to destroy the security (especially when a personal identification code having a small number of digits is used). In this embodiment, the maximum permissible number of inputs is set in the personal identification code defining region. An application or directory in which the number of input failures reaches the maximum permissible number of inputs is set to be inaccessible, thus performing access control.

Figure 9:
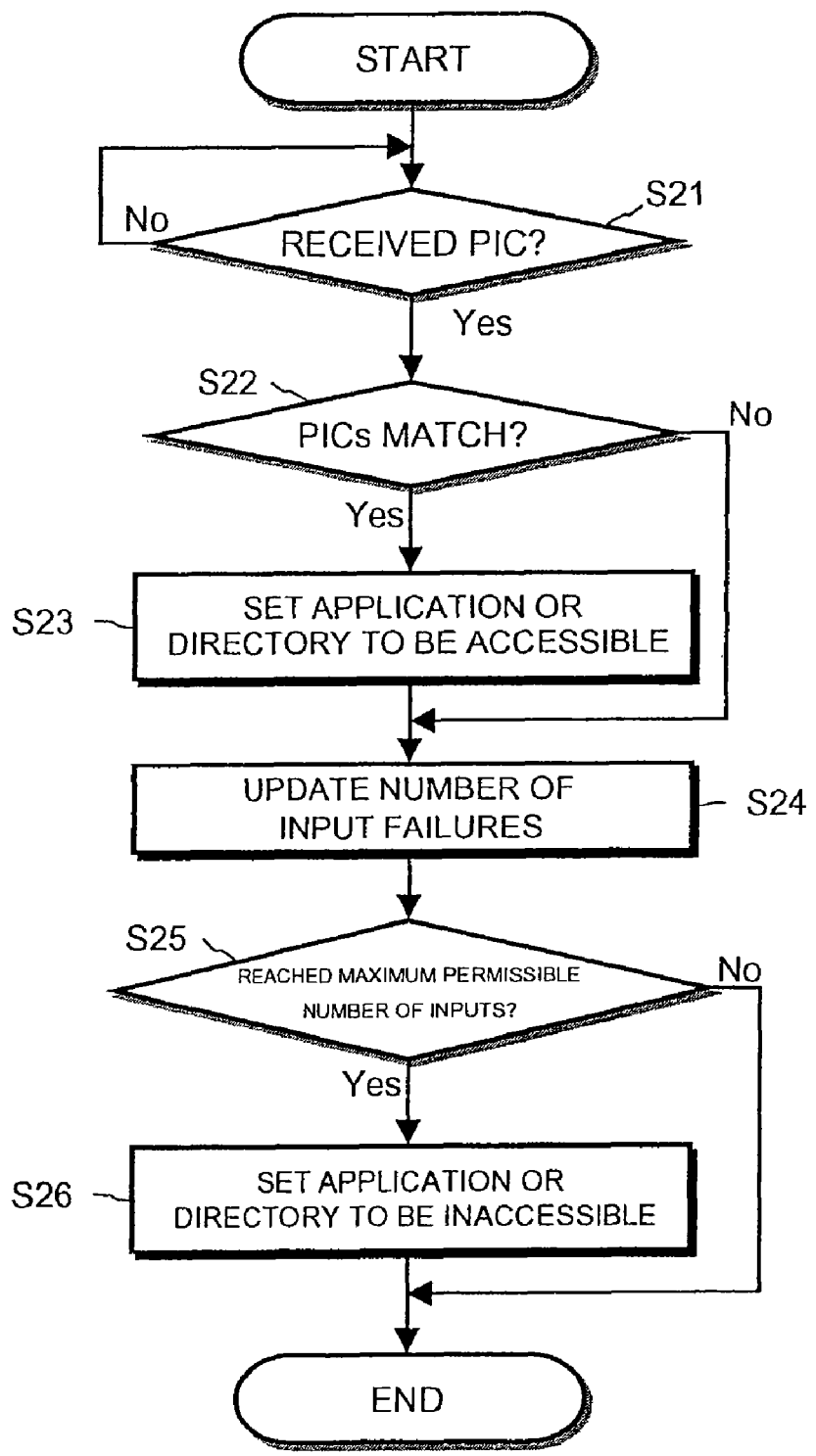
FIG. 9 is a flowchart showing a process of controlling the right to access an application or directory on the basis of the number of failures of input of the personal identification code.

FIG. 9 is a flowchart showing a process of controlling the right to access an application or directory using the number of failures of input of the personal identification code.

When the user inputs a personal identification code (step S21), the checker 53 accesses the personal identification code defining region of an application or directory in the memory space and determines whether or not the input personal identification code matches a personal identification code for the application or directory (step S22).

When the personal identification code for the application or directory matches the personal identification code input from the user, the access permission flag in the personal identification code defining region is set to enable the corresponding application or directory to be accessible (step S23).

In contrast, when the personal identification code for the application or directory does not match the personal identification code input from the user, the number of input failures in the personal identification code defining region is updated (step S24).

In step S25, it is determined whether or not the updated number of input failures has reached the maximum permissible number of inputs set in the personal identification code defining region (step S25).

If the number of input failures has reached the maximum permissible number of inputs, the setting of the access permission flag in the personal identification code defining region is cleared to make the corresponding application or directory accessible (step S26).

As a result, the act of checking every possible personal identification code by a malicious user is prevented.

When the user inputs incorrect personal identification codes and the number of input failures reaches the maximum permissible number of input failures, input of the personal identification code fails. In this case, only a manager managing the IC chip 50 may clear the region for storing the number of input failures. The manager may be authenticated using, for example, a private key.

For example, if a known ATM card is lost, funds in the account are protected when the card owner reports the loss to a bank handling the account to suspend any transaction using the bank account since the funds themselves are not stored in the card. In contrast, in a case of an IC chip having a memory region, highly-negotiable value information, such as electronic money or an electronic ticket, is stored in a semiconductor memory in the IC chip. When the lost IC chip is found by a malicious person, it is very likely that the IC chip is fraudulently used to cause economical damage.

In this embodiment, in response to turning off the power of the IC chip 50 (or the mobile terminal 10 having the IC chip 50 embedded therein), the access permission flags in all personal identification code defining regions are cleared to automatically deny access to all applications and directories. If the IC chip 50 is lost, this scheme prevents the IC chip 50 from being maintained as accessible and from being used fraudulently by a malicious user.

Figure 10:
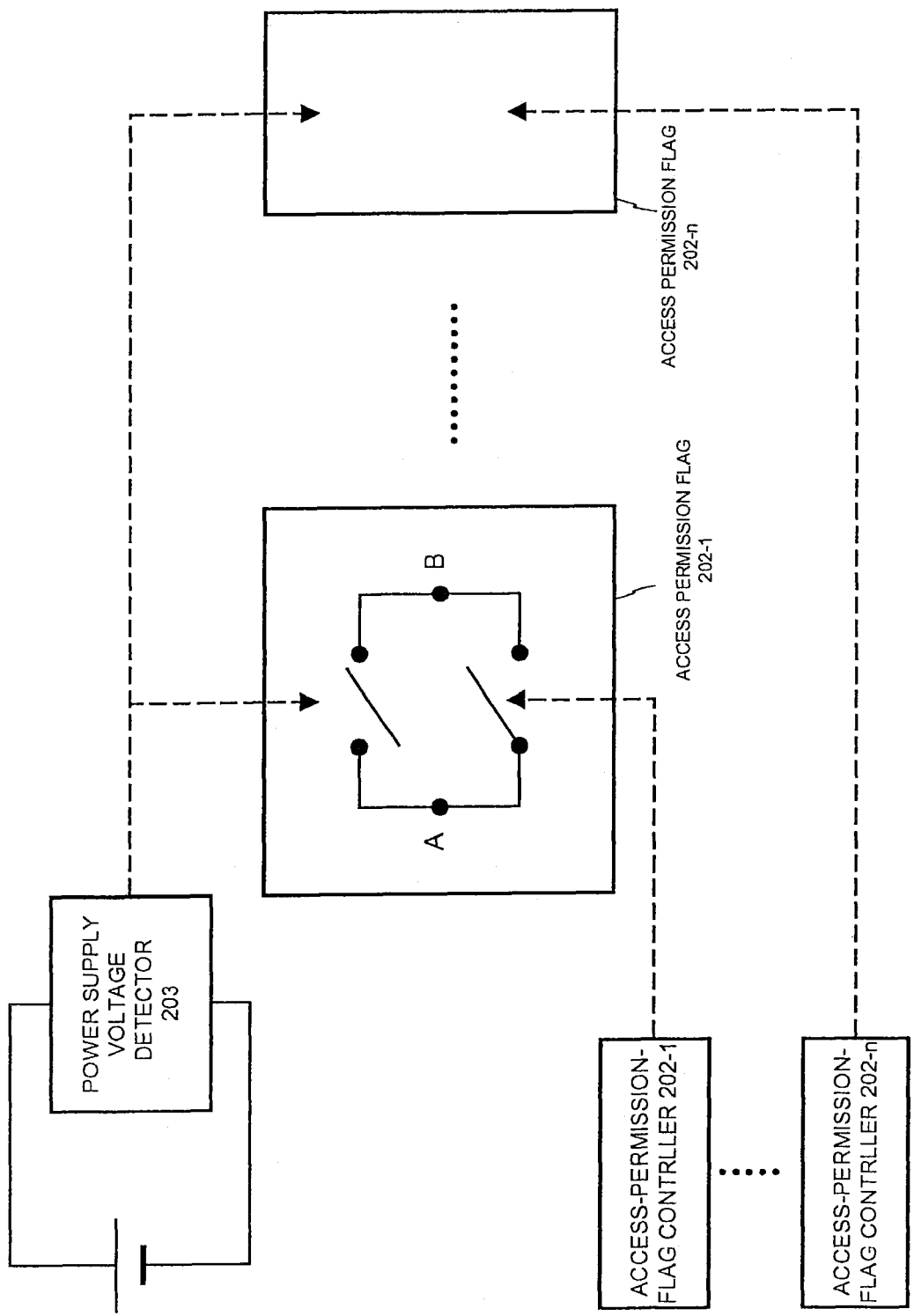
FIG. 10 is a diagram schematically showing the mechanism for automatically causing an access-permitted memory region to be inaccessible by cutting off the power supply.

FIG. 10 schematically shows the mechanism for automatically setting the accessible memory region to be inaccessible by cutting off power. The mechanism shown in the diagram is implementable using a storage medium such as a semiconductor memory in which the contents of the memory region are maintained by receiving power supply (volatile type).

Access permission flags 201-1 to 201-$n$ are provided, as shown in FIG. 6, in the personal identification code defining regions for applications and directories to which the memory region is allocated. In each of the access permission flags 202-1 to 201-$n$, contact A and contact B are arranged. The ends of contact A can be connected to the ends of contact B via switches SW1 and SW2 arranged in parallel. Opening both contact A and contact B sets the corresponding application or directory to be accessible, whereas shorting contact A and contact B sets the corresponding application or directory to be inaccessible.

Access-permission-flag controllers 202-1 to 202-$n$ are provided in the IC chip 50, and the number of access-permission-flag controllers 202-1 to 202-$n$ is equal to the number of access permission flags (that is, equal to the total number of applications and directories allocated to the memory region).

When the IC chip 50 is turned on, switch SW1 shown in the diagram is open.

In normal operation, in order to permit access to the corresponding application or directory in response to input of a personal identification code, the access-permission-flag controller 202 opens switch SW2 in the corresponding access permission flag 201. As a result, both contact A and contact B are open, and the access permission flag 201 is set to the accessible state.

In order to deny access, switch SW2 is shorted. Regardless of the state of the other switch, that is, SW1, contact A and contact B are shorted, thus setting the access permission flag to the inaccessible state.

If the IC chip 50 (or the mobile terminal 10 having the IC chip 50 embedded therein) is turned off in the accessible state in which switch SW is open, the power supply voltage is reduced from the initial voltage VCC to 0[V], and a threshold voltage Vth therebetween is detected by a voltage detector 203. In response to detection of the threshold voltage Vth, the power supply voltage detector 203 shorts all switches SW1 in the access permission flags 201-1 to 201-$n$. Regardless of the state of the other switches SW2, contacts A and contacts B in the access permission flags 201-1 to 201-$n$ are shorted. Accordingly, all access permission flags are changed to the inaccessible state at the same time.

C. Second Embodiment

Figure 11:
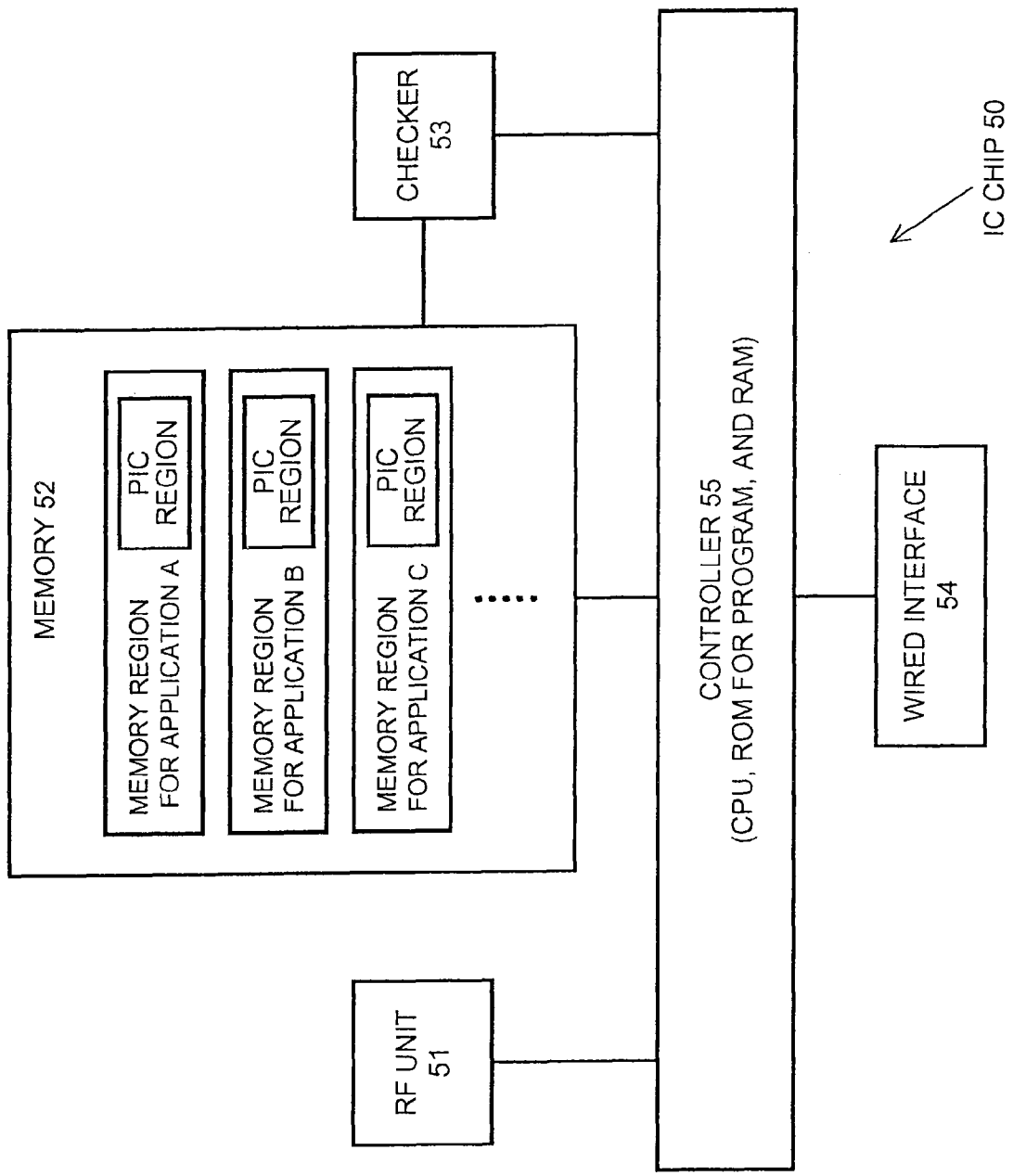
FIG. 11 is a diagram showing the internal functional configuration of an IC chip 50 embedded in a mobile terminal 10 according to a second embodiment of the present invention.

FIG. 11 illustrates the internal functional configuration of an IC chip 50 embedded in a mobile terminal 10 according to a second embodiment of the present invention.

As shown in the diagram, the IC chip 50 includes an RF unit 51 having connected thereto an antenna for establishing a wireless link with a reader/writer 101 of an external apparatus 100, a memory 52 having a storage region individually allocated to each application, such as purchased-ticket information or depositor information (electronic money) at a bank, a checker 53 for comparing and checking a personal identification code, a wired interface 54, and a controller 55 for controlling the components in a general manner.

The controller 55 is formed by integrating a CPU (Central Processing Unit), a ROM (Read Only Memory), a RAM (Random Access Memory), and the like. The controller 55 executes program code stored on the ROM to control the internal operation of the IC chip 50. Also, the controller 55 communicates with a controller 11 of the mobile terminal 10 via the wired interface 54.

In the memory 52, each application is allocated a region. In the example shown in the diagram, application A, application B, and application C are allocated individual regions on the memory 52. If necessary, a personal identification code for identification or authentication is set for each application. The region allocated to each application includes a personal identification code region for storing a personal identification code.

The memory 52 can be implemented as any type of readable/writable storage medium, such as a semiconductor memory or a magnetic stripe, and is not limited to a particular device.

In this embodiment, the checker 53 checks a personal identification code sent via the wired interface 54 against a personal identification code set in the memory region allocated to each application. If the personal identification codes match each other, access to the corresponding memory region is permitted. Information can be read from or written to the access-permitted memory region by the reader/writer 101 via the RF unit 51.

The personal identification code sent via the wired interface 54 is, in short, the personal identification code input from the user using the mobile terminal 10. In other words, according to this embodiment, the user can input a personal identification code using the user's mobile terminal 10 the user is familiar with, instead of using a user interface of the external apparatus 100 the user is unfamiliar with, and the input personal identification code is thus checked.

Figure 12:
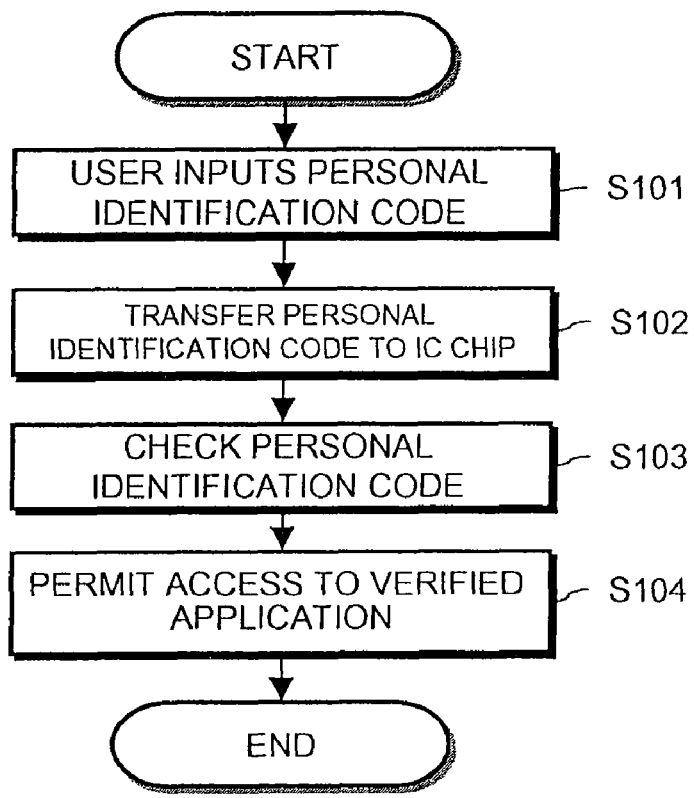
FIG. 12 is a flowchart showing a process of permitting access to an application allocated to a memory 52 by checking a personal identification code input from a user input unit 11 of the mobile terminal 10.

FIG. 12 is a flowchart showing a process of permitting access to an application allocated to the memory 52 by checking a personal identification code input from a user input unit 11 of the mobile terminal 10. With reference to the flowchart of FIG. 12, the process of permitting access to the application will now be described.

The user uses the user input unit 11 of the mobile terminal 10 to input a personal identification code (step S101).

The personal identification code input in this manner is transferred to the checker 53 in the IC chip 50 via the wired interface 52 (step S102).

The checker 53 checks the personal identification code input via the user input unit 12 against a personal identification code set for each application allocated to the memory 52 (step S103).

As a result of checking, the user is given a right to access the application in which the personal identification codes match each other (step S104). A storage region allocated to the access-permitted application becomes accessible by the reader/writer 101 using wireless communication.

Needless to say, the checker 53 not only checks a personal identification code received via the wired interface 54 (that is, input from the user using the mobile terminal 10), but also checks a personal identification code received via the RF unit 51 (that is, input from the user using the external apparatus 100).

When a series of transactions with the reader/writer 101 is completed after access has been permitted, the controller 55 analyzes the completion and sends the analysis result via the wired interface 54.

Alternatively, after normal or abnormal termination of the transactions, the controller 55 waits for a command from the wired interface 54 or waits for the mobile terminal 10 itself to be turned off (that is, waits for electromagnetic waves from the reader/writer 50 to be stopped to cause the IC chip 50 to be deactivated). In this case, after a predetermined period of time elapses, the controller 11 of the mobile terminal 10 having the IC chip 50 embedded therein performs termination processing such as sending the next command to the IC chip 50 or turning off the IC chip 50.

Figure 13:
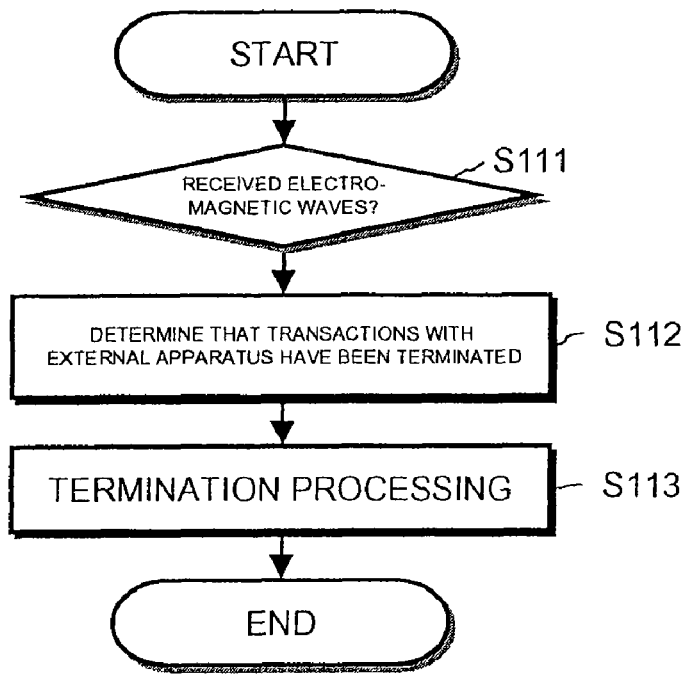
FIG. 13 is a flowchart showing a process of controlling the right to access an application on the basis of the result of detecting electromagnetic waves sent from an external apparatus 50.

FIG. 13 is a flowchart showing a process of controlling the right to access an application on the basis of a result of detecting electromagnetic waves sent from the external apparatus 50. In accordance with the flowchart, control over the right to access the application will now be described.

In a period during which the IC chip 50 is wirelessly connected with the external apparatus 100 via the RF unit 51, the controller 55 determines at all times whether or not electromagnetic waves are received via the RF unit 51 (step S111).

In response to detecting no electromagnetic waves, it is determined that a series of transactions between the external apparatus 100 and the IC chip 50, which are wirelessly connected with each other via the RF unit 51, is terminated (step S112).

The controller 55 performs termination processing to terminate the transactions with the external apparatus 100 (step S113). As a result, the right given to the external apparatus 100 to access the application disappears.

As a result, after being used, the IC chip 50 is not maintained in a state in which each application is accessible. For example, when the mobile terminal 10 is lost or stolen, unauthorized use of each application is prevented. The user is thus prevented from suffering from unauthorized use or theft of value information such as electronic money.

Figure 14:
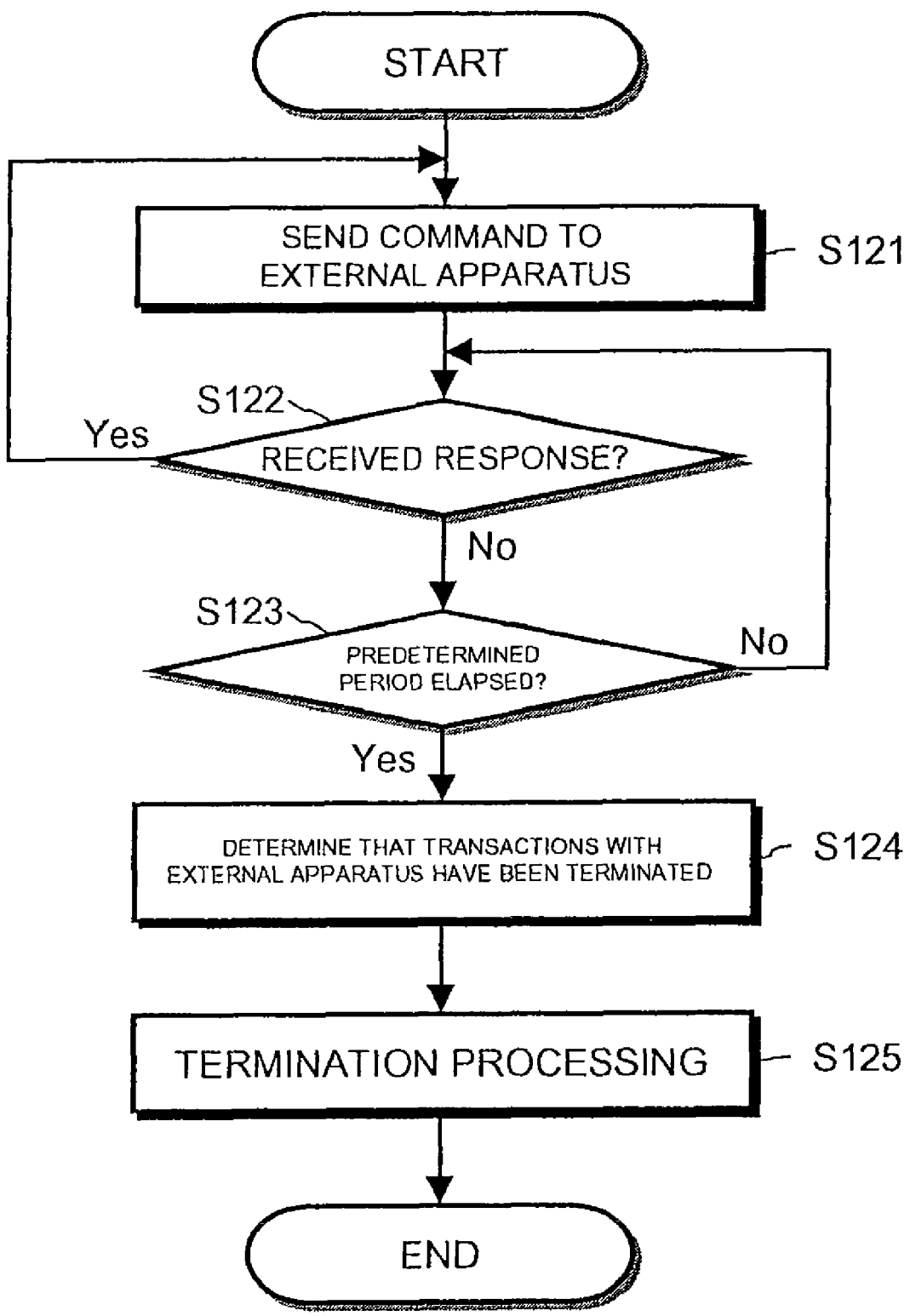
FIG. 14 is a flowchart showing a process of controlling the right to access an application on the basis of a response from an external apparatus 100 in response to a command sent from the IC chip 50.

FIG. 14 is a flowchart showing a process of controlling the right to access an application on the basis of a response from the external apparatus 100 in response to a command sent from the IC chip 50. In accordance with the flowchart, control over the right to access the application will now be described.

When the controller 55 sends a command to the external apparatus 100 via the RF unit 51 (step S121), the controller 55 determines whether or not a response in response to the command has been given (step 1S22).

When no response is received within a predetermined period of time after sending the command (step S123), it is determined that a series of transactions between the IC chip 50 and the external apparatus 100 has been terminated normally or abnormally (step S124), and termination processing to terminate the transactions with the external apparatus 100 is performed (step S125).

As a result, after the wireless link with the external apparatus 100 is broken, the IC chip 50 is not maintained in a state in which the right to access each application is given. For example, when the mobile terminal is lost or stolen, unauthorized use of each application is prevented. The user is thus prevented from suffering from unauthorized use or theft of value information such as electronic money.

Prior to receiving a personal identification code via the wired interface 54, the IC chip 50 performs wireless communication with the reader/writer 55 via the RF unit 41 and sends/receives data to/from the external apparatus 100. Subsequently, when data is to be sent and received further, the controller 55 detects that authentication using a personal identification code is necessary and sends the detection result to the controller 11 of the mobile terminal 10 via the wired interface 54.

Figure 15:
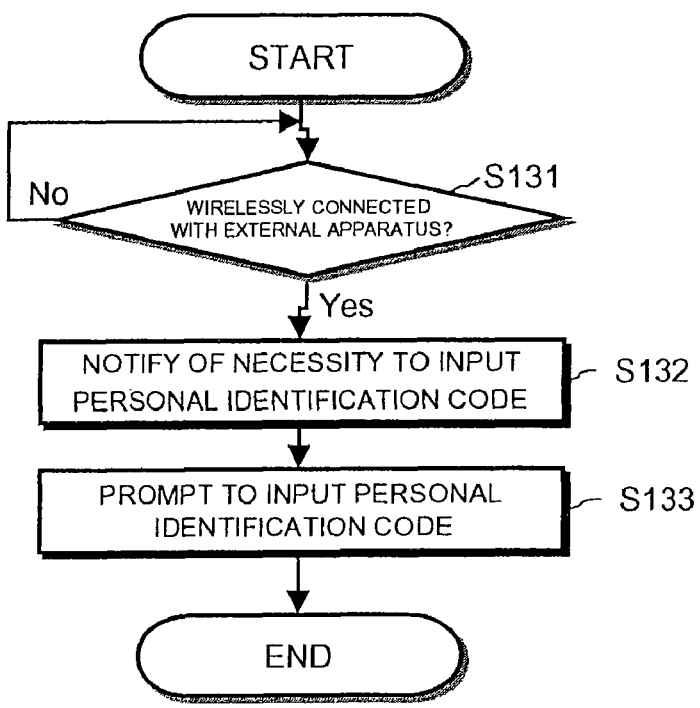
FIG. 15 is a flowchart showing a process of prompting the user to input a personal identification code to the mobile terminal in response to establishment of a wireless link between the IC chip 50 and the external apparatus 100 via an RF unit 51.

FIG. 15 is a flowchart showing a process of prompting the user to input a personal identification code to the mobile terminal in response to establishment of a wireless link between the IC chip 50 and the external apparatus 100 via the RF unit 51.

The controller 55 determines at all times whether or not the IC chip 50 is wirelessly connected with the external apparatus 100 via the RF unit 51 (step S131).

When the IC chip 50 is connected with the external apparatus 100 via the RF unit 51 and power is supplied to the IC chip 50, the controller 55 notifies, via the wired interface 54, the controller 11 of the mobile terminal 10 of the necessity to input a personal identification code for accessing the memory 52 (step S132).

In response to the notification, the mobile terminal 10 emits a beep or displays a dialog on the display unit 12 to prompt the user to input a personal identification code for using a desired application (step S133).

Accordingly, the user is reliably reminded of the necessity to input a personal identification code when the user holds the mobile terminal above the external apparatus to use an application. Application use in every aspect of the user's everyday life is thus facilitated.

D. Third Embodiment

Figure 16:
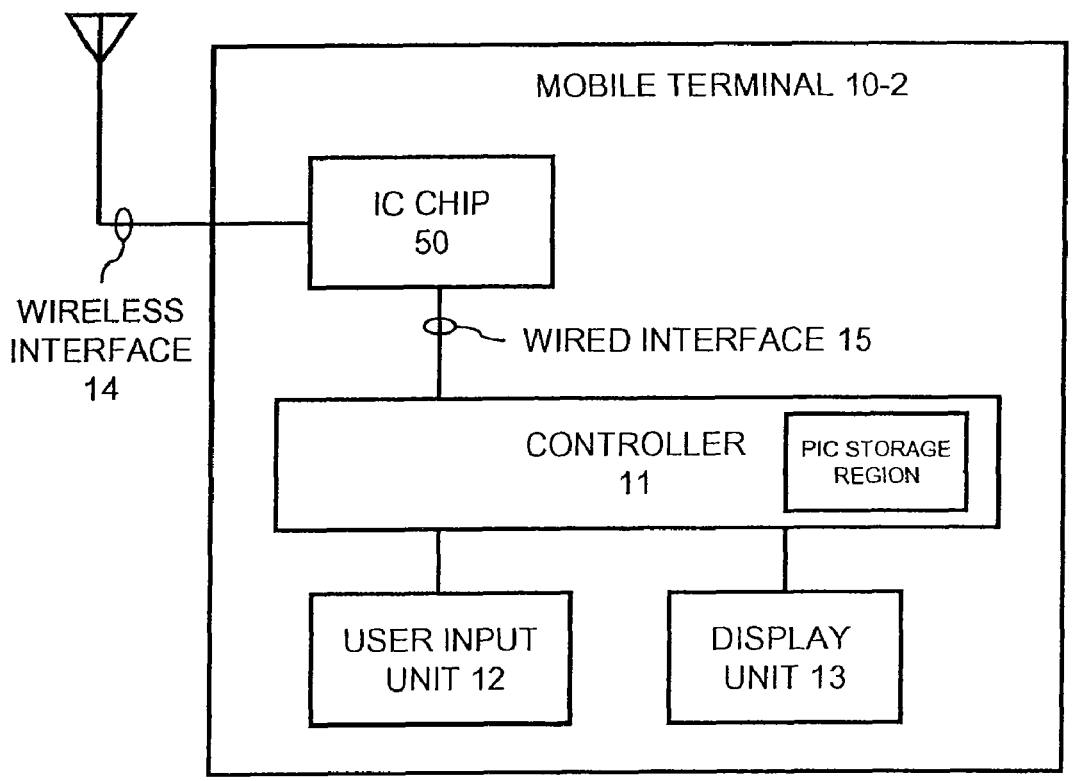
FIG. 16 is a diagram schematically showing the hardware configuration of a mobile terminal 10-2 according to a third embodiment of the present invention.

FIG. 16 schematically shows the hardware configuration of a mobile terminal 10-2 according to a third embodiment of the present invention.

The mobile terminal 10-2 shown in the diagram includes an IC chip 50 which is driven by receiving power using wireless communication with an external apparatus and which has a memory function, a controller 11 for controlling the overall internal operation of the mobile terminal 10, a user input unit 12 formed of keys/buttons for inputting by the user various character strings and commands, such as a personal identification number or password, and a display unit 13, such as an LCD (liquid Crystal Display), for displaying the processing result. Needless to say, the mobile terminal 10-2 may include peripheral units and circuit components other than those shown in the diagram in order to implement the primary function of the mobile terminal 10-2.

The IC chip 50 includes a wireless interface 14 for establishing a wireless link with an external apparatus 100 and a wired interface 15 for establishing a wired connection with the controller 11 of the mobile terminal 10. The wireless interface 14 uses, for example, a contact interface standard defined by ISO 7816 or a wireless interface standard defined by ISO 14443 (the same as above).

The IC chip 50 is manufactured by adopting, for example, a contactless IC card technology. The IC chip 50 is driven by electromagnetic waves received from the external apparatus 100 via the wireless interface. In other words, when the user is not holding the mobile terminal 10 above the external apparatus 100, electromagnetic waves from the external apparatus 100 do not reach the mobile terminal 10, and the operation of the IC chip 50 is deactivated. The right to access the interior of the IC chip 50 thus disappears.

The IC chip 50 has a relatively-high-capacity memory region. Such a memory region is made possible by miniaturization technology. The memory region is formed of a semiconductor memory, a magnetic stripe, or other readable/writable storage media. One or more applications are allocated on the memory region. An example of application includes value information, such as electronic money or an electronic ticket.

In order to protect this type of value information from being used without permission or stolen, the right to access each application is controlled using a personal identification code such as a personal identification number or password in application units. For example, a personal identification code input via the wireless interface 14 or the wired interface 15 is checked against a personal identification code for each application, and the right to access each application is given when the personal identification codes match each other.

The mobile terminal 10-2 is formed by providing a personal identification code storage region in the controller 11 in the mobile terminal shown in FIG. 1. A personal identification code corresponding to a program in the controller 11 is stored in advance in the personal identification code storage region. This enables the personal identification code corresponding to the called program to be sent to the IC chip 50 via the wired interface. The user is thus not required to sequentially input personal identification codes in order to use the same application stored in the IC chip 50, and the operability of the apparatus is improved.

Figure 17:
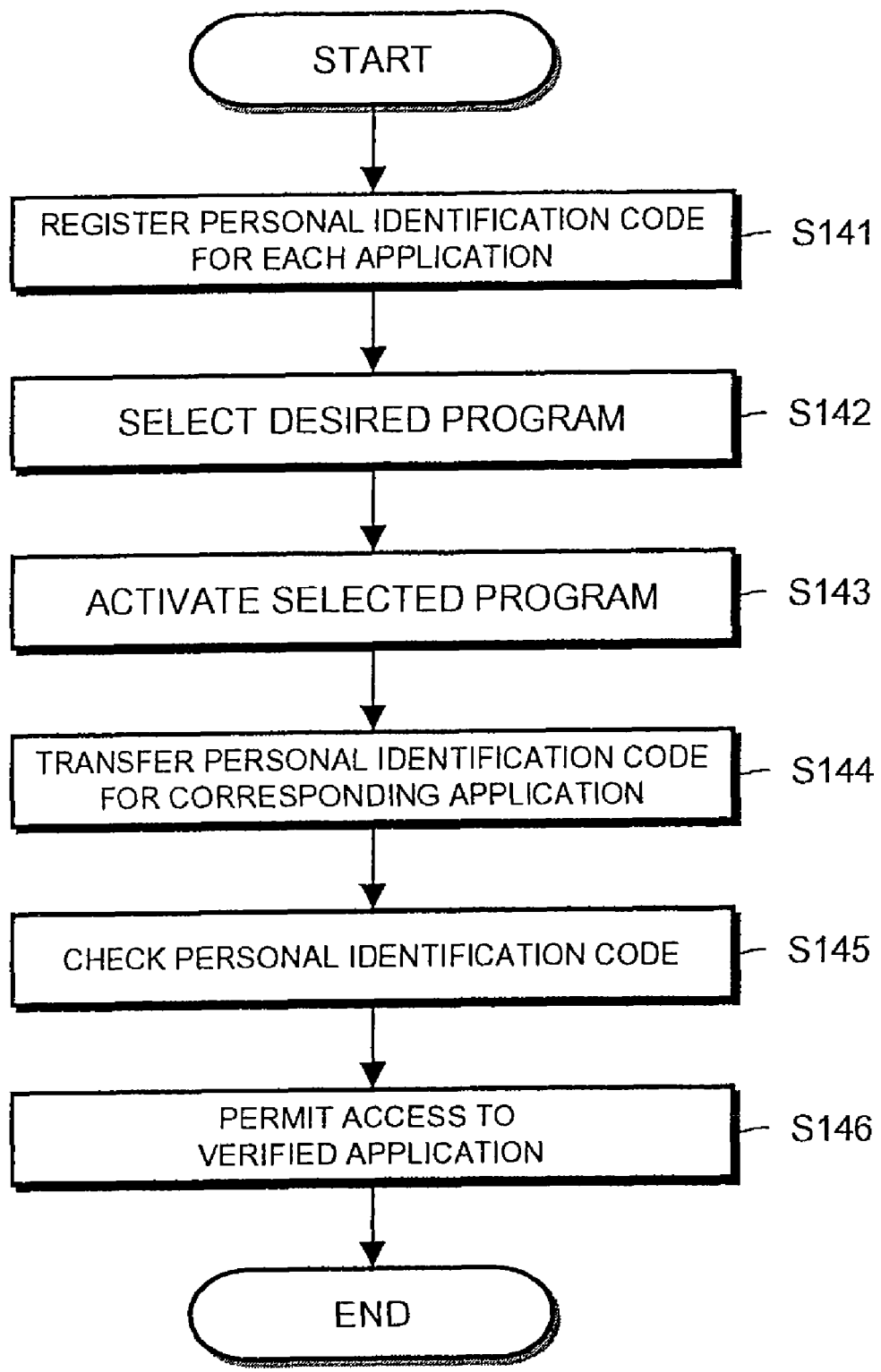
FIG. 17 is a flowchart showing a process of omitting input of a personal identification code by activating a program.

FIG. 17 is a flowchart of a process of omitting the inputting of a personal identification code by activating a program.

A personal identification code for each application is registered in advance (step S141). The registered personal identification code is stored in a predetermined personal identification number storage region in the controller 55.

When the user wants to use an application, the user selects a desired program from, for example, a menu list (not shown) displayed on the display unit 13 (step S142).

As a result, the controller 11 activates the selected program (step S143).

The controller 11 reads a personal identification code for the corresponding application in accordance with the activated program from the personal identification code storage region and sends the personal identification code to the IC chip 50 via the wired interface 15 (step S144).

As a result, in the IC chip, the personal identification code received via the wired interface 15 is checked against the personal identification code set for each application allocated to the memory region (step S145).

As a result of checking, the user is given the right to access the application in which the personal identification codes match each other (step S146). The storage region allocated to the application to which the access right is given is accessible by the reader/writer 101 using wireless communication.

In such a case, the user selects a desired program from a menu screen displayed on the display, and the corresponding program is called to the mobile terminal. In response to the activated program, a personal identification code for the corresponding application is input to the IC chip via the wired interface, and the right to access the application is thus given. The user can omit the inputting of a personal identification code for a desired application, and the operability of the apparatus is improved.

With reference to the specific embodiments, the present invention has been described in detail. However, it is to be understood that various modifications and substitutions can be made by those skilled in the art without departing from the scope of the present invention.

In this specification, cases have been described in which the IC chip according to the present invention is used by being embedded in the mobile terminal such as a cellular phone or PDA. However, the scope of the present invention is not limited to these cases. The merits of the present invention are similarly achieved by, for example, using the IC chip in a stand-alone manner or by embedding the IC chip in another type of device and using the IC chip.

In short, the present invention has been disclosed by examples for illustration purposes, and the description should not be interpreted in a limited manner. The scope of the present invention is to be determined solely by the appended claims.

According to the present invention, there are provided an improved information storage medium which can be used be being placed in an information processing apparatus, such as a cellular phone or PDA (Personal Digital Assistant), an IC chip with a memory region, an information processing apparatus having the IC chip with the memory region, and a memory management method for the information storage medium.

According to the present invention, there are provided an improved information storage medium which has a memory region and which efficiently controls the right to access each application allocated to the memory region, an IC chip with a memory region, an information processing apparatus having the IC chip with the memory region, and a memory management method for the information storage medium.

According to the present invention, the memory region on the IC chip has a hierarchical structure. Each application allocated to the memory region is registered in a directory. The memory region is efficiently managed in directory units.

According to the present invention, a personal identification code is set for each application and directory. As the case may be, the access right is controlled in application units or in directory units. For example, for all applications included in a directory, an identification or authentication scheme having the same usability as the existing IC chip may be provided.

According to the present invention, when the IC chip or the mobile terminal having the IC chip embedded therein is lost, the right to access each application in the IC chip automatically disappears. Accordingly, the IC chip or the mobile terminal is protected against fraudulent use by others.

Identification or authentication using the IC chip according to the present invention may be performed in conjunction with authentication using a private key. As a result, value information such as electronic money can be handled with higher security.

According to the present invention, for example, when the IC chip embedded in the mobile terminal is used as a bank card, identification or authentication processing is performed on the user by inputting, by the user, a personal identification number using the mobile terminal the user is familiar with. This results in minimization of the amount of operation that the user has to perform using a bank's ATM terminal the user is unfamiliar with.

According to the present invention, holding the mobile terminal towards, for example, an ATM terminal in a bank causes the ATM terminal to prompt the mobile terminal to input an appropriate personal identification code.

According to the present invention, a program and a personal identification code are associated with each other in the mobile terminal. Therefore, for example, when a bank's balance-of-account displaying program is called, the personal identification number is automatically called.

The invention claimed is:

1. A mobile terminal apparatus comprising:
 a semiconductor integrated circuit device having:
 (a) a memory region;
 (b) a wireless interface for enabling the semiconductor integrated circuit device to perform wireless communication with an external apparatus; and
 (c) a wired interface for performing wired communication with the semiconductor integrated circuit device;
 one or more applications allocated to the memory region, wherein the right to access each application is controlled by a personal identification code;
 user input means for inputting, from a user, the personal identification code and other data;
 checking means for:
 (a) transferring, via the wired interface, the personal identification code input from the user input means to the semiconductor integrated circuit device; and
 (b) checking the transferred personal identification code with a personal identification code for each application allocated to the memory region;
 access-right control means for giving, as a result of checking by the checking means, a right to the user to access the application in which the personal identification codes match each other; wherein the access-right control means:
 (a) sets each application for which the personal identification code is set to be inaccessible in a default setting;
 (b) in response to the personal identification code input from the user matching the set personal identification code, sets the corresponding application to be accessible;
 (c) in response to the personal identification code input from the user matching a set additional personal identification code, sets all applications in the corresponding memory region to be accessible; and
 (d) sets all applications to be inaccessible when a predetermined period of time elapses.

2. The mobile terminal apparatus of claim 1, wherein the access-right control means permits the external apparatus to access the application for which the access right is given via the wireless interface using wireless communication.

3. The mobile terminal apparatus of claim 1, wherein, in response to detecting no electromagnetic waves from the external apparatus connected via the wireless interface, the access-right control means determines that a series of transactions related to the application for which the access right is given has terminated and performs transaction termination processing.

4. The mobile terminal apparatus of claim 1, wherein, in response to receiving no response within a predetermined period of time in response to a command sent from the semiconductor integrated circuit device via the wireless interface, the access-right control means determines that a series of transactions between the external apparatus and the semiconductor integrated circuit device, which are connected with each other via the wireless interface, has terminated normally or abnormally and performs termination processing.

5. The mobile terminal apparatus of claim 1, further comprising:
 personal identification code registering means for registering in advance the personal identification code for each application;
 program activating means; and
 personal identification code input means for inputting the personal identification code for the corresponding application in accordance with the activated program to an IC chip via the wired interface.

6. The mobile terminal apparatus of claim 1, wherein the semiconductor integrated circuit device is driven by receiving power using wireless communication with the external apparatus.

7. The mobile terminal apparatus of claim 6, wherein, in response to being connected to the external apparatus via the wireless interface and thus receiving power, the semiconductor integrated circuit device notifies via the wired interface of the necessity to input the personal identification code for accessing the memory region.

8. The mobile terminal apparatus of claim 1, which includes the access-right control means sets all applications to be inaccessible when a predetermined period of time elapses without a response from the external apparatus.

* * * * *